(12) United States Patent
Isogai et al.

(10) Patent No.: US 6,624,854 B1
(45) Date of Patent: Sep. 23, 2003

(54) PROJECTION IMAGE DISPLAY DEVICE

(75) Inventors: Hiroyuki Isogai, Kanagawa (JP);
Masaya Fujita, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/493,809

(22) Filed: Jan. 28, 2000

(30) Foreign Application Priority Data

Mar. 17, 1999 (JP) ............................................ 11-072273
Sep. 20, 1999 (JP) ............................................ 11-266053

(51) Int. Cl.[7] ................................................. H04N 5/64
(52) U.S. Cl. ........................ 348/744; 348/734; 348/705
(58) Field of Search ................................. 348/744–747, 348/750, 751, 734, 705, 706; 345/156, 158; H04N 5/64

(56) References Cited

U.S. PATENT DOCUMENTS

| 4,202,611 | A |   | 5/1980  | Parker ......................... 352/179 |
|-----------|---|---|---------|-----------------------------------------|
| 4,633,514 | A | * | 12/1986 | Fimoff et al. ............. 455/151.2    |
| 4,754,204 | A | * | 6/1988  | Ando et al. .................. 315/367   |
| 4,816,908 | A | * | 3/1989  | Colineau et al. ........ 315/368.12      |
| 4,951,131 | A | * | 8/1990  | Lindahl .................. 315/368.11    |
| 5,136,397 | A |   | 8/1992  | Miyashita .................... 358/236   |
| 5,880,745 | A |   | 3/1999  | Miichi ......................... 345/520 |

FOREIGN PATENT DOCUMENTS

| DE | 37 10 218  | 10/1987 |
| DE | 196 06 227 | 8/1997  |
| GB | 2 285 158  | 6/1995  |
| JP | 7120836    | 5/1995  |
| JP | 8-172676   | 7/1996  |

* cited by examiner

Primary Examiner—Michael H. Lee
(74) Attorney, Agent, or Firm—Greer, Burns & Crain Ltd.

(57) ABSTRACT

A projection image display device capable of operating only predetermined one among a plurality of projection image displays. An AND gate 25 performs switching between first and second states, the first state being for transmitting a remote control signal received by an IR receiving section 23 to a control unit 11 according to an output of a switch circuit 24, and the second state being for transmitting no remote control signals received by the IR receiving section 23 to the control unit 11. The switch circuit 24 may be switched manually or by means of a signal from the control unit 11.

6 Claims, 23 Drawing Sheets

FIG. 25
Leader
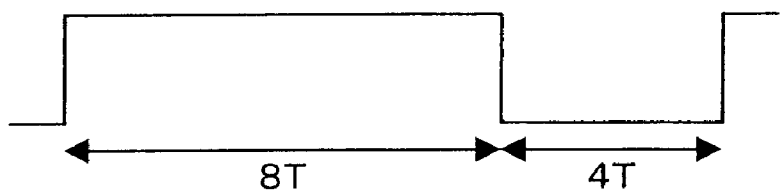
Data
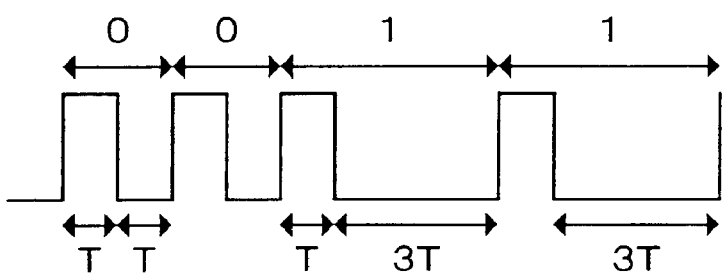
Trailer
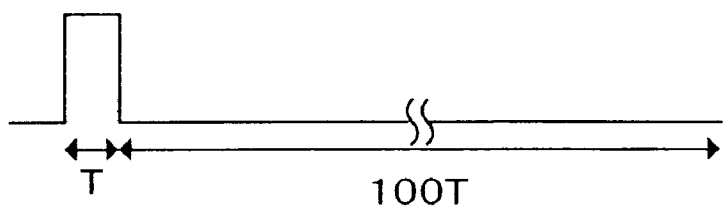

PROJECTION IMAGE DISPLAY DEVICE

BACKGROUND OF THE INVENTION

1. Field of the Invention

The present invention relates to a projection image display device operated by a remote controller (referred to as a "remote control transmitter", hereinafter). More particularly, the invention relates to a projection image display device capable of controlling a plurality of projection image displays by one remote control transmitter, and a projection image display device provided with a plurality of remote control signal receiving sections.

2. Description of the Prior Art

In exhibitions, training courses, and so on, projection image displays are used to project images on large screens. In particular, a projection image display called a liquid crystal projector is widely used as it is easily connected to a computer, VTR or the like.

The liquid crystal projector comprises a liquid crystal panel for generating an image according to a signal outputted from the computer, VTR or the like, and an optical engine for projecting the image generated by the liquid crystal panel on the screen in an enlarged manner.

FIG. 1 shows in outline an optical engine of a liquid crystal projector. A light source 50 is, for instance a metal halide lamp, and a dichroic ref lector 51 is arranged around this light source 50. The dichroic reflector 51 orients a light emitted from the light source 50 in one direction. In the front side of a travelling direction of the light emitted from the light source 50, a reflection mirror 52a is arranged at an angle of 45° to an optical axis. A UV (ultraviolet-ray)/IR (infrared-ray) cut filter 53 is arranged in the front side of an travelling direction of the light reflected by the reflection mirror 52a. Further down the front side from the cut filter 53, a dichroic mirror 54a for separating a blue light (B), a dichroic mirror 54b for separating a green light (G) and a reflection mirror 52c are arranged all at angles of 45° to the optical axis. A reflection mirror 52b is arranged above the dichroic mirror 54a; a dichroic mirror 54c above the dichroic mirror 54b; and a dichroic mirror 54d above the reflection mirror 52c. The reflection mirror 52b and the dichroic mirrors 54c and 54d are respectively arranged in parallel with the dichroic mirrors 54a and 54b and the reflection mirror 52c. Also, a projection lens 57 is arranged in a side direction of the dichroic mirror 54d.

A capacitor lens 55a and a liquid crystal panel 56a for a blue image are arranged between the reflection mirror 52b and the dichroic mirror 54c. A capacitor lens 55b and a liquid crystal panel 56b for a green image are arranged between the dichroic mirrors 54b and 54c, and a capacitor lens 55c and a liquid crystal panel 56c for a red image are arranged between the dichroic mirror 54b and the reflection mirror 52c. Each of the liquid crystal panels 56a to 56c has a structure, which is built by sealing in a liquid crystal between two transparent substrates: one transparent substrate including a plurality of pixel electrodes arranged in a matrix form, and the other including counter electrodes arranged oppositely to the pixel electrodes. By controlling a voltage applied between the pixel electrode and the counter electrode for each pixel, a transmitted light quantity is adjusted for each pixel to generate an image.

With the liquid crystal projector constructed in the above manner, a light emitted from the light source 50 is reflected on the reflection mirror 52a, and ultraviolet and infrared rays are removed from the light while passing through the filter 53. Then, the light passed through the filter 53 is separated by the dichroic mirror 54a into a blue light (B) to be reflected on the mirror 54a and a light to transmit through the mirror 54a. The light reflected on the mirror 54a is further reflected on the reflection mirror 52b, and passes through the capacitor lens 55a to reach the liquid crystal panel 56a. Then, a transmittance of the blue light (B) is controlled for each pixel by means of an image signal supplied to the liquid crystal panel 56a, and a blue image is generated.

On the other hand, the light transmitted through the dichroic mirror 54a is separated by the dichroic mirror 54b into a green light (G) to be reflected on the dichroic mirror 54b and a red light (R) to transmit through the same. The green light (G) obtained by separation performed by the dichroic mirror 54b passes through the capacitor lens 55b to reach the liquid crystal panel 56b. Then, a transmittance of the green light (G) is controlled for each pixel by means of an image signal supplied to the liquid crystal panel 56b, and a green image is generated. Likewise, the red light (R) transmitted through the dichroic mirror 54b passes through the capacitor lens 55c to reach the liquid crystal panel 56c, and a red image is generated by means of an image signal supplied to the liquid crystal panel 56c. The blue image generated by the liquid crystal panel 56a transmits through the dichroic mirror 54c. By the dichroic mirror 54c, the blue image is synthesized with the green image generated by the liquid crystal panel 56b. Then, by the dichroic mirror 54d, the synthesized image is further synthesized with the red image generated by the liquid crystal panel 56c. The image synthesized in this manner is then projected through the projection lens 57 on the screen.

Usually, the liquid crystal projector can be remotely controlled on its operations including input signal switching, brightness adjustment, contrast adjustment, zooming, focusing, lamp turning ON/OFF, and so on, and operations regarding voices (volume adjustment or the like) by using a remote control transmitter.

FIG. 2 is a block diagram showing an electric circuitry of a conventional liquid crystal projector. A video signal and a synchronizing signal outputted from a computer or a video device enter a liquid crystal driving circuit 62. The liquid crystal driving circuit 62 separates the video signal into an R signal for a red image, a G signal for a green signal and a B signal for a blue image. The driving circuit 62 supplies these R, G and B signals respectively to a liquid crystal panel (R panel) 63a for a red image, a liquid crystal panel (G panel) 63b for a green image and a liquid crystal panel (B panel) 63c for a blue image together with the synchronizing signal.

A control unit 61 sends a signal specifying a display starting position and a signal specifying resolution to the liquid crystal driving circuit 62. The control unit 61 controls a digital/analog converter (abbreviated to "DAC", hereinafter) 64, and changes brightness and contrast. In addition, the control unit 61 also controls a character generator 65, and displays a menu screen, a setting screen or the like by the liquid crystal driving circuit 62. In addition, the control unit 61 controls a cooling fan 71 by a fan driving circuit 70.

An operation panel 72 includes various operation buttons provided to be operated by a user. An IR receiving section 73 receives infrared rays transmitted from a remote control transmitter (not shown), and outputs a signal to the control unit 61. Upon having received the signal from the IR receiving section 73, the control unit 61 analyzes the signal, and controls each section according to the analyzing result.

FIG. 3 is a flowchart showing processing performed by the control unit 61 at the time of receiving a remote control signal.

In step S51, the control unit 61 monitors the presence or absence of a signal from the IR receiving section 73. Upon having received a signal from the IR receiving section 73, the process moves to step S52, where analysis of a code of the received signal starts. Then, in step S53, determination is made as to whether the code is normal or not. If it is determined that the code is not normal, then, the process ignores the received signal and returns to step S51, where the control unit 61 continues monitoring the presence or absence of a signal from IR receiving section 73.

On the other hand, in step S53, if it is determined that the code of the received signal is normal, the process moves to step S54 where processing is executed according to a command contained in the received signal.

The inventors consider that problems described below are inherent in the conventional liquid crystal projector. Specifically, in exhibitions, training courses, and so on, a plurality of liquid crystal projectors are simultaneously used most often than not. In such a case, if image focus, brightness or contrast is adjusted by the remote control transmitter, the plurality of projectors will be simultaneously actuated, and adjustment of only a desired projector will be impossible. Accordingly, complex treatments must be carried out. For example, the operation by the remote control transmitter must be canceled to perform adjustment by using an operation, panel of the projector main body. Alternatively, to prevent infrared rays from reaching the other projectors, for example, the IR receiving sections of the other projectors must be covered with paper or the like.

Instead of the infrared-ray remote control transmitter (cordless remote controller), a wire remote controller may be used. However, in the case of the wire remote controller, the same number of remote controllers as that of projectors must be prepared. Considering operability, the use of the wire remote controller will not be practical. A computer or the like may be used to operate the plurality of projectors by one wire remote controller. But the computer must be installed in addition to the projectors, and thus the use of the computer will not be practical, either.

In the case of a projection image display of a type attached to a ceiling, assuming that remote control signal receiving sections are provided in the front and rear sides of the display, an fluorescent lamp if located in the vicinity of one remote control signal receiving section may cause an erroneous operation. This is because the remote control signal receiving section receives noises generated from the fluorescent lamp.

SUMMARY OF THE INVENTION

The present invention was made with the above-described problems in mind, and it is an object of the present invention is to provide a projection image display device comprising a plurality of remote control signal receiving sections and capable of preventing an erroneous operation caused by noises generated from a fluorescent lamp or the like.

As illustrated in FIGS. 1 and 6, a projection image display device of the present invention comprises: image generators 13a, 13b and 13c (equivalent to 56a, 56b and 56c in FIG. 1), each means being for generating an image according to a video signal; an image projector (57 in FIG. 1) for projecting the image generated by each of the image generators 13a, 13b and 13c; image adjusting circuits 16 and 17, each means being for adjusting the image projected on the screen; a plurality of remote control signal receivers 26 and 28 for receiving remote control signals outputted from a remote control transmitter; and a control circuit 11 for monitoring outputs of the plurality of remote control signal receivers 26 and 28, controlling each of the image adjusting circuits 16 and 17 according to a normal remote control signal, the remote control signal having been received any one of the remote control signal receivers 26 and 28, and ignoring a signal received by the other of the remote control signal receivers 26 or 28 at least for a specified period of time until the control of each of the image adjusting circuits 16 and 17 according to the received remote control signal is completed.

An object of the present invention is to prevent erroneous operations. This object is basically achieved in the following manner. After a normal remote control signal is received by one remote control signal receiver, signal received by the other remote control signal receiver is ignored at least until image adjustment according to the normal remote control signal is finished. Thus, for example, when noises are superimposed on an output of the other remote control signal receiver, the output of the same is ignored.

BRIEF DESCRIPTION OF THE DRAWINGS

FIG. 25 is a view showing examples of leader, code data and trailer sections of a remote control signal.

DESCRIPTION OF THE PREFERRED EMBODIMENTS

Next, the preferred embodiments of the present invention will be described with reference to the accompanying drawings.

First Embodiment

In accordance with the present invention, by the switching unit, switching can be made between the first state (ON state) of transmitting an output from the remote control signal receiver to the control circuit and the second state (OFF state) of transmitting no outputs from the remote control signal receiver to the control circuit. Accordingly, by using the switching unit to place only a projection image display to be operated by the remote control transmitter in the first state and the other projection image displays in the second state, only a desired projection image display can be operated by the remote control transmitter.

The switching unit may be composed of a manually operated switch or a switch controlled by the control circuit of the projection image display device. If the projection display is provided with an external terminal for connection with another display, the control circuit may control the switching unit according to a signal entered from another display. For example, if a plurality of projection image displays are connected to each other through the external terminal, the switching unit of the projection image display ("master display") that receives no signals from the other display is set in the first state. The switching unit of the projection image display ("slave display") that receives a signal from the other display is set in the second state. Thus, only the master display can receive a remote control signal. The master display can transmit a signal through the external terminal to the slave display, and the remote control transmitter can control the slave display by using the master display.

Figure 4:
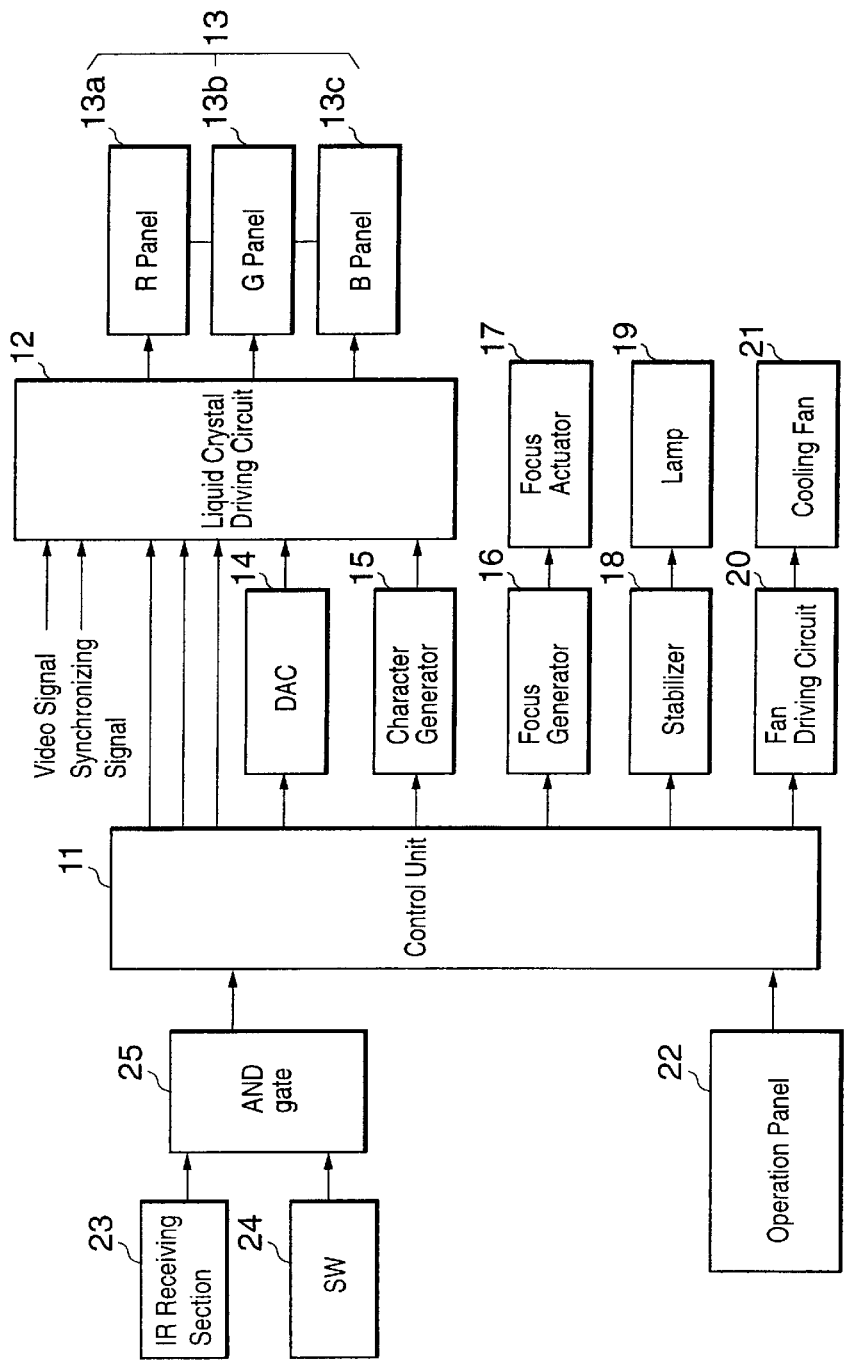
FIG. 4 is a block diagram showing an electric circuitry of a liquid crystal projector according to a first embodiment of the present invention.

FIG. 4 is a block diagram showing an electric circuitry of a liquid crystal projector according to a first embodiment of the present invention. An optical engine of the liquid crystal projector of the embodiment is basically similar in constitution to that of the conventional example (see FIG. 1), and thus description thereof is omitted.

A video signal and a synchronizing signal outputted from a computer or a video device enter a liquid crystal driving circuit 12. The liquid crystal driving circuit 12 separates the video signal into R (red), G (green) and B (blue) signals. The R signal is supplied to a liquid crystal panel (R panel) 13a for a red image; the G signal to a liquid crystal panel (G panel) 13b for a green image; and the B signal to a liquid crystal panel (B panel) 13c for a blue image. The liquid crystal driving circuit 12 also transmits the synchronizing signal to each of the liquid crystal panels 13a to 13c.

A control unit 11 includes a microprocessor, and transmits various control signals to the liquid crystal driving circuit 12. The control signals transmitted from the control unit 11 to the liquid crystal driving circuit 12 may include, for instance, a signal specifying a display position, a signal specifying resolution (numbers of dots in horizontal and vertical directions), and so on.

The control unit 11 controls a digital/analog converter (DAC) 14, and also controls brightness or contrast of a projected video. In addition, the control unit 11 controls a character generator 15, and displays a menu screen, a setting screen, a test patter for focus adjustment or the like by the liquid crystal driving circuit 12.

A focus driving circuit 16 drives and controls a focus actuator 17 according to a signal from the control unit 11, and adjusts a focus of a projected image. A stabilizer 18 controls turning ON/OFF of a lamp 19 according to a signal from the control unit 11. A fan driving circuit 20 controls turning ON/OFF of a cooling fan 21 according to a signal from the control unit 11. In accordance with the embodiment, a rotation sensor (not shown) is provided for monitoring a rotational state of the cooling fan 21, and a temperature sensor (not shown) is provided for monitoring a temperature in the projector. The control unit 11 controls rotation of the cooling fan 21 according to outputs of these sensors.

An operation panel 22 includes various operation buttons. By using these operation buttons, adjustment can be made for power turning ON/OFF, zooming, focusing, a volume or the like, a menu screen can be displayed, and other various operations can-be performed.

An IR receiving section 23 receives an infrared-ray signal (remote control signal) sent from a remote control transmitter which will be described later, converts the signal into an electric signal, and then outputs this electric signal. The signal outputted from the IR receiving section 23 is sent to an AND gate 25. A switch circuit (SW) 24 includes a sliding switch or a press button switch attached to the projector main body. The switch circuit 24 outputs "H" when the switch is turned ON, and "L" when the switch is turned OFF. The AND gate 25 transmits the signal outputted from the IR receiving section 23 to the control unit 11 while "H" is outputted from the switch circuit 24, and cuts off the signal outputted from the same while "L" is outputted from the switch circuit 24.

Figure 7:
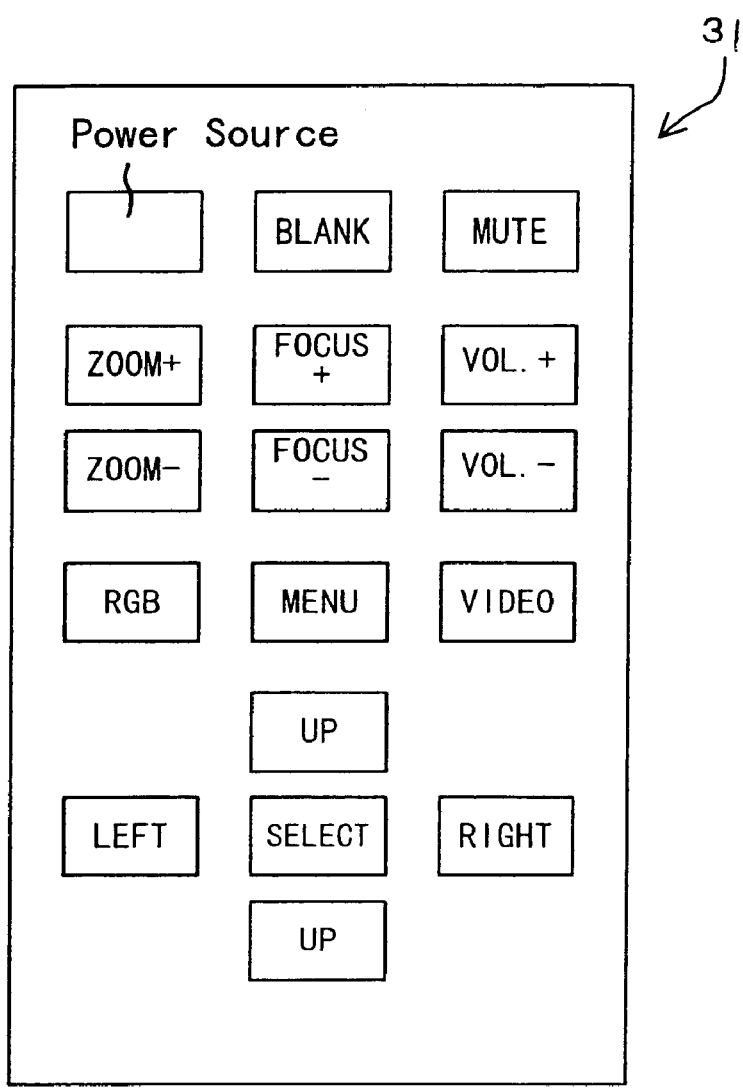
FIG. 7 is a plan view showing an example of a remote control transmitter.

FIG. 7 is a plan view showing an example of a remote control transmitter. The remote control transmitter is provided with various buttons. For example, as shown in FIG. 7, the remote control transmitter 31 includes: a "POWER SOURCE" button for turning power ON/OFF; a "BLANK" button for temporarily turning OFF displaying; a "MUTE" button for temporarily cutting off a voice;

"ZOOM+" and "ZOOM−" buttons for adjusting magnification of projection; "VOLUME+" and "VOLUME−" buttons for adjusting volumes; an "RGB" button for entering a video signal (R/G/B signal) from a personal computer or the like; a "MENU" button for switching displaying/ undisplaying of a menu; "UP", "DOWN", "LEFT" and "RIGHT" buttons for moving a cursor during menu displaying; and a "SELECT" button pressed when a menu item of a cursor position is decided. When any one of these buttons is pressed, the remote control transmitter 31 outputs an infrared-ray signal (remote control signal) according to the pressed button. The operation panel 22 is also provided with buttons having the same functions as those of the above buttons.

A user turns ON/OFF the switch circuit 24 depending on validation/invalidation of an operation performed by the remote control transmitter of the projector. To validate the operation of the remote control transmitter, the switch circuit 24 is turned ON. To adjust the other projectors by the remote control transmitter, the switch circuit 24 is turned OFF.

Now, it is assumed that the switch circuit 24 has been turned ON. In this case, after the IR receiving section 23 has received a remote control signal, a signal outputted from the IR receiving, section 23 is transmitted through the AND gate 25 to the control unit 11.

Figure 8:
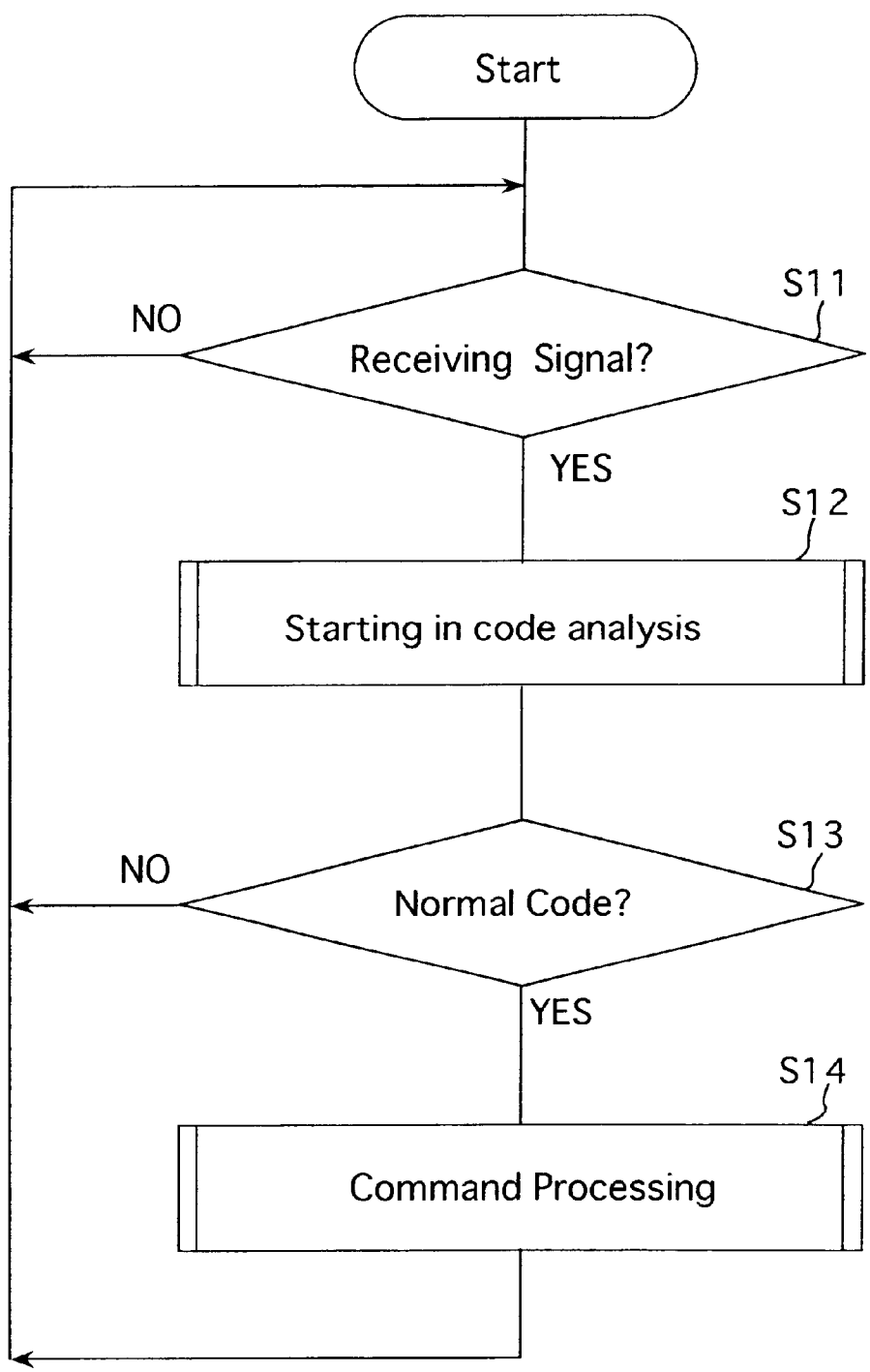
FIG. 8 is a flowchart showing an operation of the liquid crystal projector of the first embodiment.

Next, an operation performed by the control unit 11 of the liquid crystal projector of the embodiment will be described with referring to a flowchart of FIG. 8.

In step S11, the control unit 11 monitors reception of a remote control signal through the AND gate 25. Upon having received the remote control signal, the process moves from step S11 to step S12, and starts analysis of a code of the received signal. Then, in step S13, the control unit 11 determines whether the code is normal or not, in other words, whether the code is one set for the liquid crystal projector or not.

Figure 9:
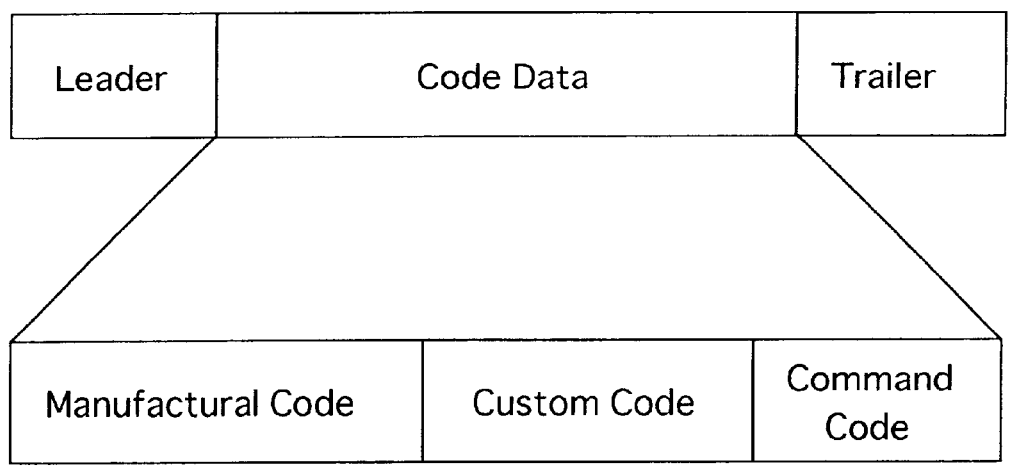
FIG. 9 is a view showing a frame structure of a remote control signal.

FIG. 9 is a view showing a frame structure of a remote control signal. As shown in FIG. 9, one frame of the remote control signal is composed of a leader section indicating the start of the frame, code data section including a manufacture code, a custom code and a command code, and a trailer section indicating the end of the remote control signal.

The control unit 11 analyzes the remote control signal entered from the IR receiving section 23, determines whether a manufacture code and a custom code coincide with specified codes (codes for the liquid crystal projector) or not. If NO, the process ignores the received signal and returns from step S13 to step S11. On the other hand, if the manufacture code and the custom code coincide with the specified codes, then the process moves from step S13 to step S14, and analyzes a command contained in the remote control signal. The control unit 11 then executes processing according to this command. For example, the control unit 11 drives and controls the focus actuator 17 to adjust a focus according to the command, controls the turning ON/OFF of the lamp by the stabilizer 18, controls DAC 14 to change brightness or contrast, or controls the character generator 15 to display a specified menu or the like. Subsequently, the process returns to step S11, and monitors reception of a next signal. The above processing is started by turning ON power for the liquid crystal projector and finished by turning OFF power.

On the other hand, to invalidate the operation performed by the remote control transmitter of the projector, the switch circuit 24 is turned OFF ("L"). Accordingly, even if the remote control signal is received by the IR receiving section 23, the signal is cut of f by the AND gate 25 to prevent its transmission to the control unit 11. Thus, in the projector with switch circuit 24 turned OFF, the operation by the remote control transmitter is invalidated.

Figure 10:
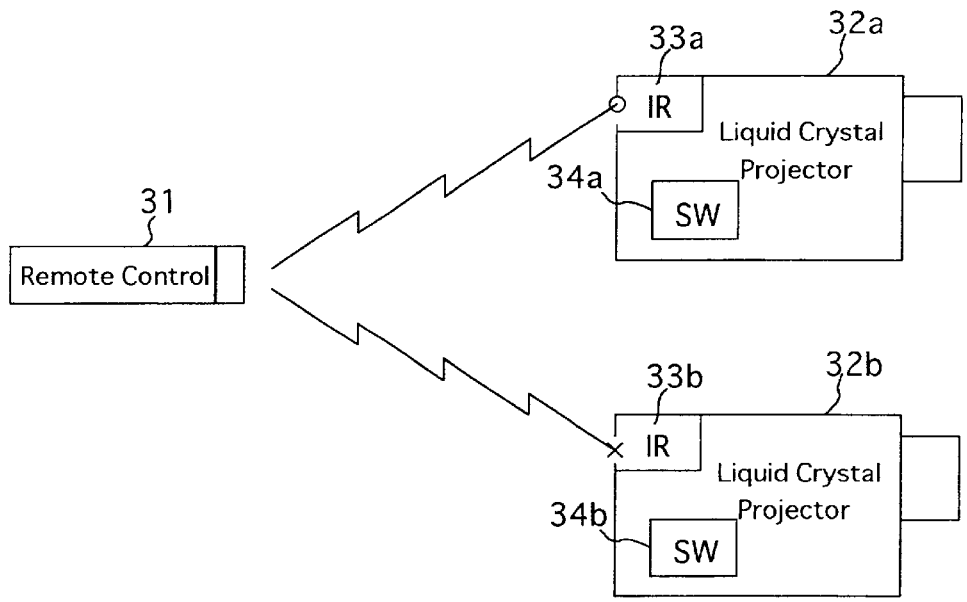
FIGS. 10 and 11 are views showing a state of connecting the two liquid crystal projectors of the first embodiment.
Figure 11:
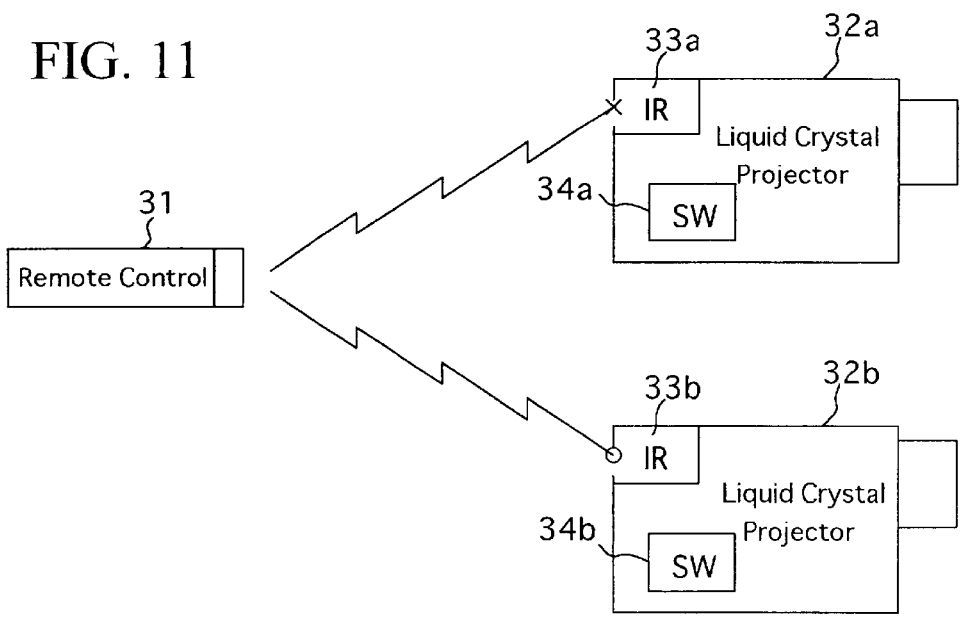

For example, as shown in FIG. 10, to control two liquid crystal projectors 32a and 32b by one remote control transmitter 31, a switch circuit 34a (equivalent to the switch circuit 24 in FIG. 4) of the projector 32a is turned ON, and a switch circuit 34b (equivalent to the switch circuit 24 in FIG. 4) of the projector 32b is turned OFF. Then, only the projector 32a can be controlled by the remote control transmitter 31. Accordingly, even if focus adjustment or brightness adjustment is performed for the projector 32a by using the remote control transmitter 31, a focus or brightness of the projector 32b will never be changed. Conversely, as shown in FIG. 11, the switch 34a of the projector 32a is turned OFF, and the switch 34b of the projector 32b is turned ON. Then, only the projector 32b can be controlled by the remote control transmitter 31.

In accordance with the first embodiment, to adjust predetermined one among the plurality of liquid crystal projectors, the switch circuit 24 of only the predetermined liquid crystal projector is turned ON. Thus, only the predetermined liquid crystal projector can be operated by the remote control transmitter, and erroneous operations of the other projectors can be prevented.

Second Embodiment

In accordance with the present invention, the projection image display device is provided with the first and second remote control signal receivers, and the first and second switching unit for performing switching between the first state (ON state) of transmitting the outputs of the remote control signal receiver to the control circuit and the second state (OFF state) of transmitting no outputs of the remote control signal receiver to the control. Generally, the projection image display includes a remote control signal receiving section arranged in its front side (projection screen side). But, to operate the remote control transmitter behind the display, it is convenient to provide another remote control signal receiving section in the rear side of the display. Thus, if one projection image display is provided with a plurality of remote control signal receiving sections, the switching unit must be provided to individually validate/invalidate the respective remote control signal receiving sections. In this case, if all the remote control signal receiving sections are set to be invalid, then there will be no effects even if the other projection image displays are operated by the remote control transmitter. In other words, by properly switching the first and second switching unit, only a desired projection image display can be operated by the remote control transmitter.

Japanese Patent Laid-Open Hei. 7(1995) 120836 disclosed a multiple projection device capable of adjusting a plurality of projectors by one remote control transmitter. The disclosed multiple projection device is designed to simultaneously adjust zooming or focusing of the plurality of projectors. However, this device is different from the device of the present invention in that it is not designed to individually operate the plurality of projectors.

Figure 1:
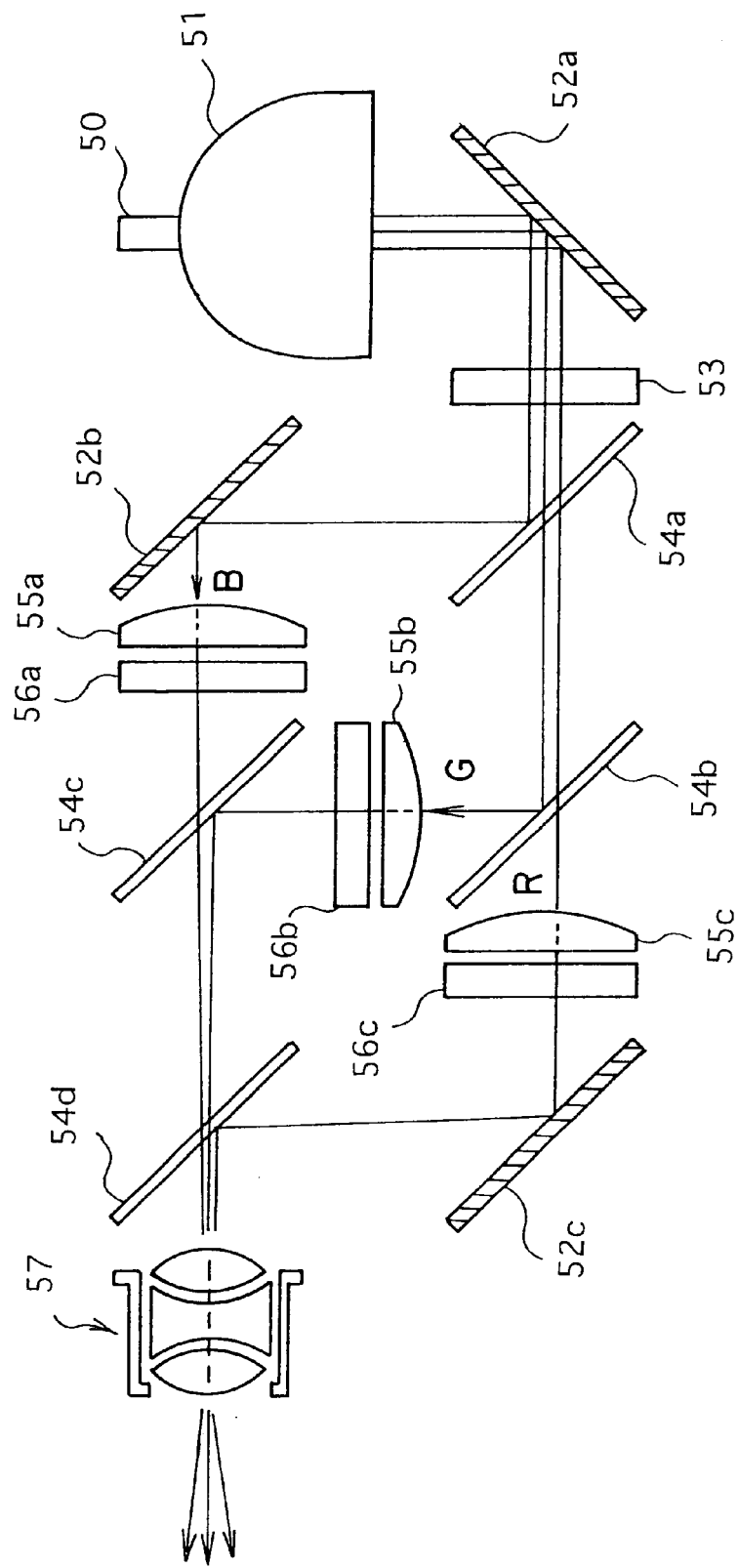
FIG. 1 is a view showing in outline an optical engine of a liquid crystal projector.
Figure 2:
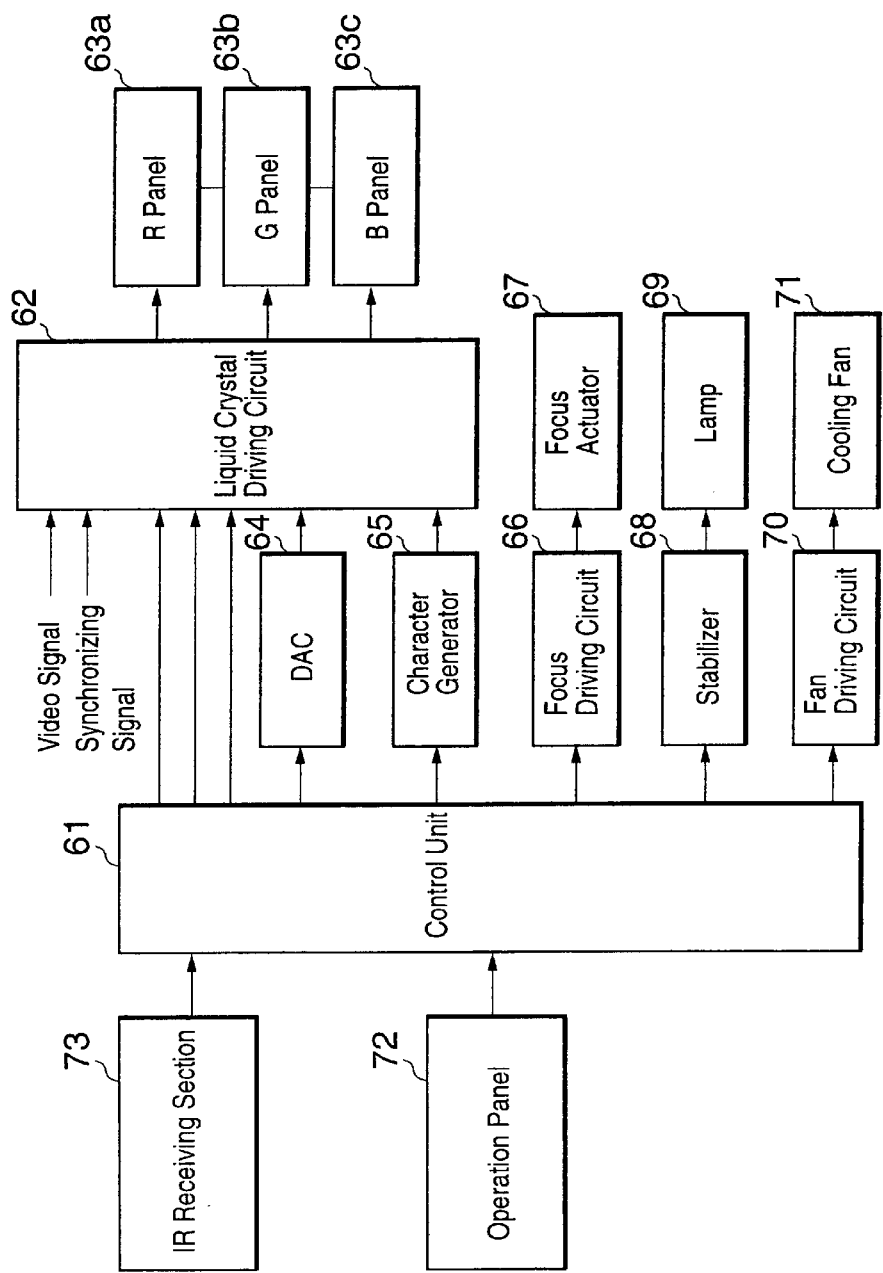
FIG. 2 is a block diagram showing an electric circuitry of a conventional liquid crystal projector.
Figure 3:
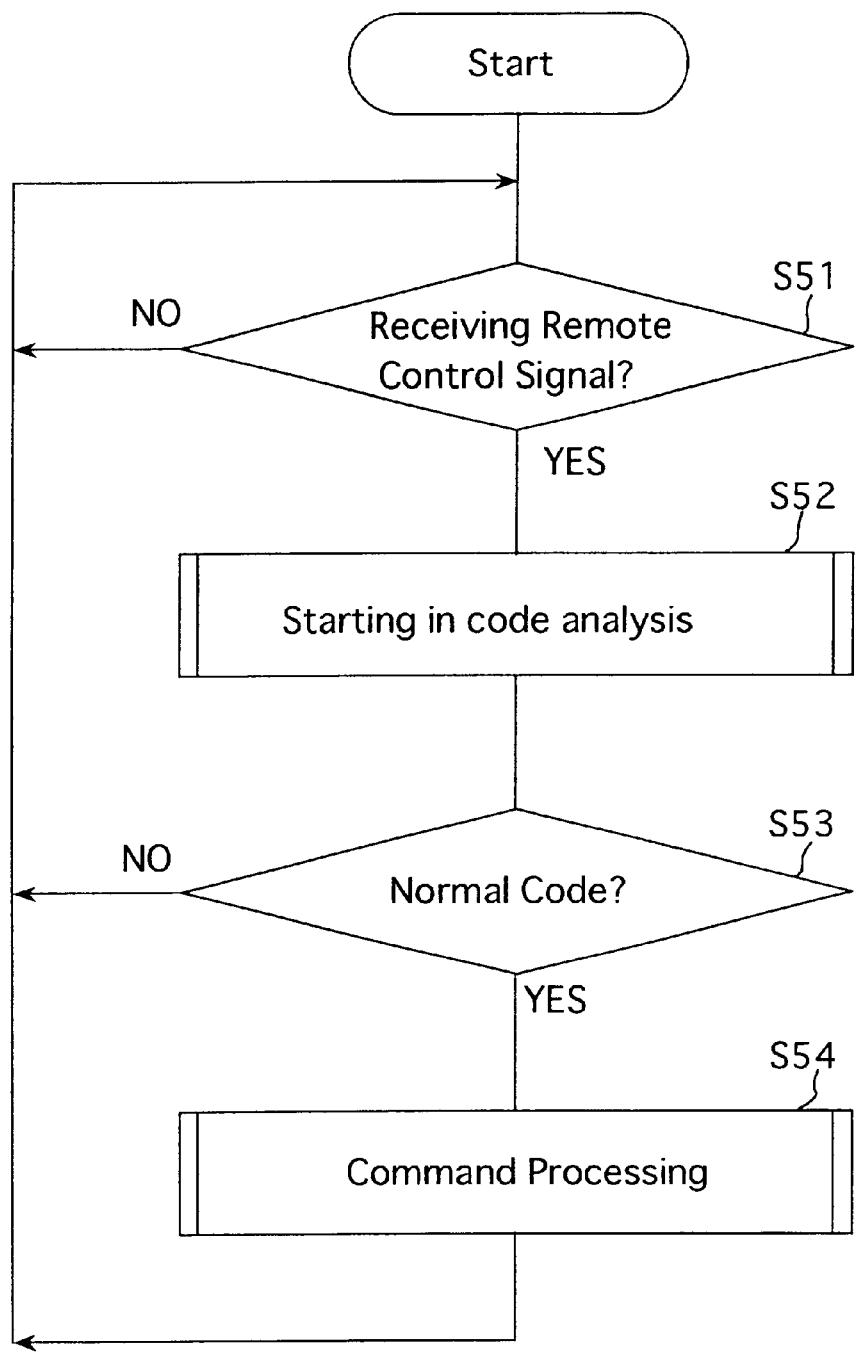
FIG. 3 is a flowchart showing processing performed by the conventional liquid crystal projector at the time of receiving a remote control signal.
Figure 5:
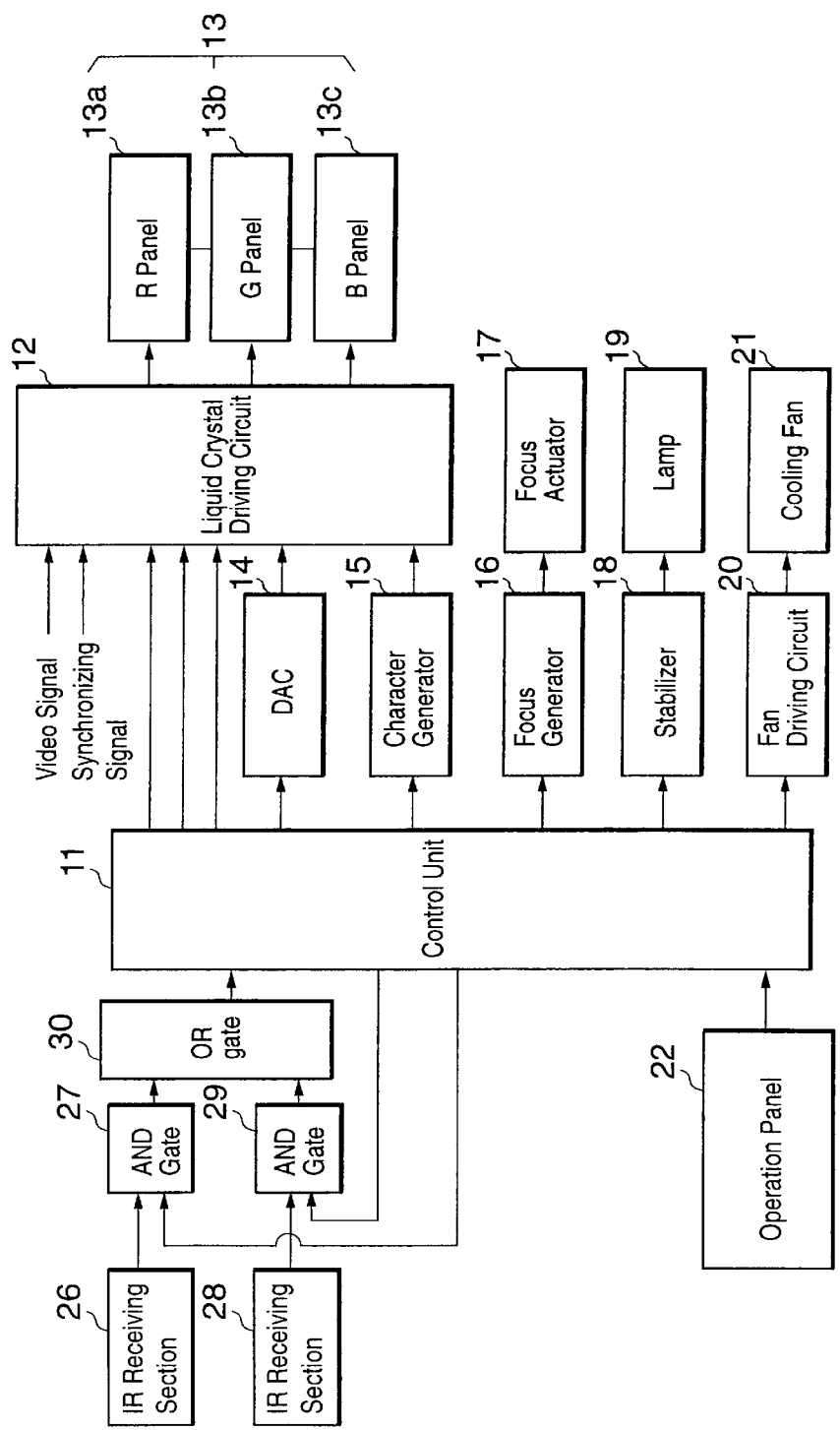
FIG. 5 is a block diagram showing an electric circuitry of a liquid crystal projector according to a second embodiment.
Figure 12:
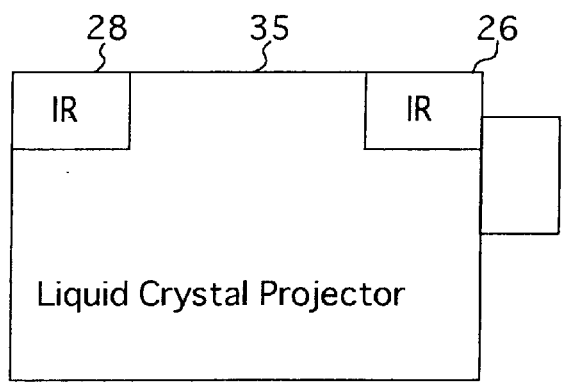
FIG. 12 is a schematic view showing the liquid crystal projector of the second embodiment of the invention.

FIG. 12 is a schematic view showing a liquid crystal projector according to a second embodiment of the present invention. FIG. 5 is a block diagram showing an electric circuitry of the liquid crystal projector of the second embodiment. In FIG. 5, the same elements as the elements in FIG. 1 are indicated by the same reference numerals as the reference numerals in FIG. 1, and the detailed description is omitted.

The liquid crystal projector 35 of the embodiment includes IR receiving sections 26 and 28 provided in its front (screen side) and rear sides. As shown in FIG. 5, the IR receiving section 26 is connected to an AND gate 27, and the IR receiving section 28 is connected to an AND gate 29. Outputs of the AND gates 27 and 29 are connected to an OR gate 30. A remote control signal received by the IR receiving section 26 or 28 enters a control unit 11 through the OR gate 30. The output of the IR receiving section 26 is transmitted through the AND gate 27 to the OR gate 30 when a signal from the control unit 11 is "H". When the signal from the control unit 11 is "L", the IR receiving section 26 and the OR gate 30 are disconnected from each other. Likewise, the output of the IR receiving section 28 is transmitted through the AND gate 29 to the OR gate 30 when a signal from the control unit 11 is "H". When the signal from the control unit 11 is "L", the IR receiving section 28 and the OR gate 30 are disconnected from each other.

Figure 13:
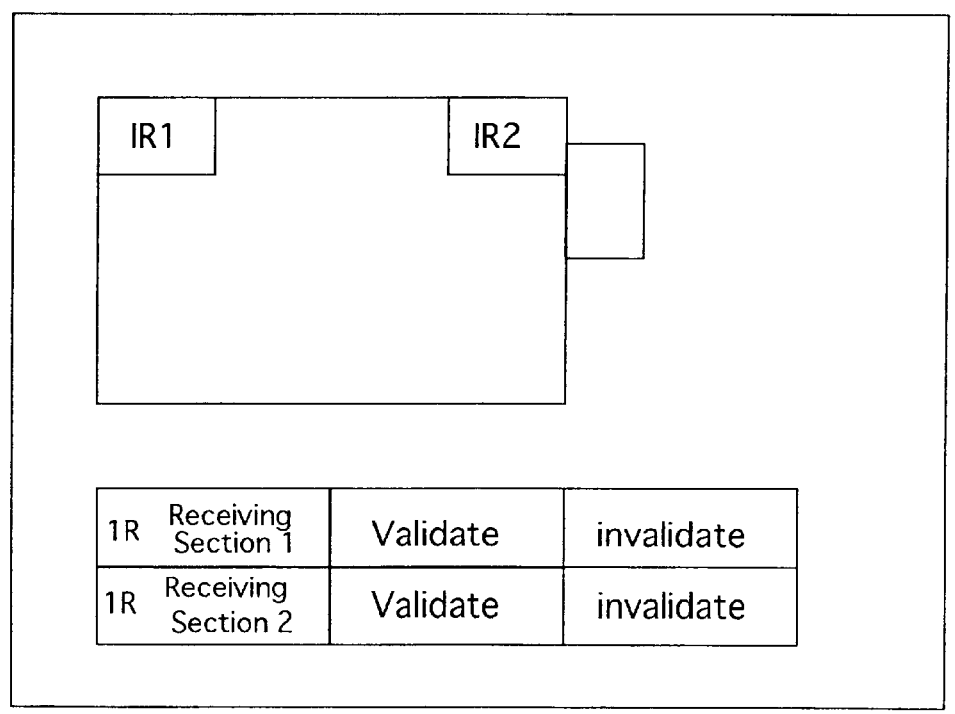
FIG. 13 is a view showing an example of a screen display of the liquid crystal projector of the second embodiment.

In accordance with the embodiment, for example, when a user executes a specified operation on an operation panel 22, the liquid crystal projector 35 displays a screen like that shown in FIG. 13. While this screen is displayed, a cursor moving button (equivalent to any one of "UP", "DOWN", "LEFT" and "RIGHT" buttons of the remote control transmitter 31 shown in FIG. 7) of the operation panel 22 is pressed. Then, a cursor (in the drawing, characters are white, and backgrounds are black) is moved to individually validate/invalidate the IR receiving sections 26 and 28. If the IR receiving section 26 is set to be valid, the control unit 11 outputs "H" to the AND gate 27, and "L" if set invalid. Similarly, if the IR receiving section 28 is set to be valid, the control unit 11 outputs "H" to the AND gate 29, and "L" if set invalid.

Generally, the liquid crystal projector for presentation or the like includes the IR receiving section provided in its front side. This is because a lecturer typically operates the remote control transmitter oriented to the screen while watching the screen. Infrared rays emitted from the remote control transmitter are reflected on the screen to enter the IR receiving section of the liquid crystal projector.

In accordance with the embodiment, as shown in FIG. 12, the liquid crystal projector 35 includes another IR receiving section 28 provided in the rear side. Accordingly, if the remote control transmitter is operated behind the liquid crystal projector 35, infrared rays directly enter the projector 35. Thus, compared with one having infrared rays reflected on the screen, the liquid crystal projector of the embodiment is advantageous in that a reaching distance of a remote control signal can be longer. While any one of the IR receiving sections 26 and 28 is in a valid state, a focus or the like of the liquid crystal projector 35 can be adjusted by the remote control transmitter. Also, by setting both of the IR receiving sections 26 and 28 to be invalid, the remote control signal is prevented from being transmitted to the control unit 11. Accordingly, occurrence of erroneous operations can be prevented during adjustment of the other projectors.

In the case of the liquid crystal projector of a type suspended from a ceiling, if both of the IR receiving sections 26 and 28 are set to be valid, noises generated from a fluorescent lamp installed on the ceiling may be detected to cause erroneous operations. Thus, either one of the IR receiving sections should preferably be set valid.

Third Embodiment

Figure 14:
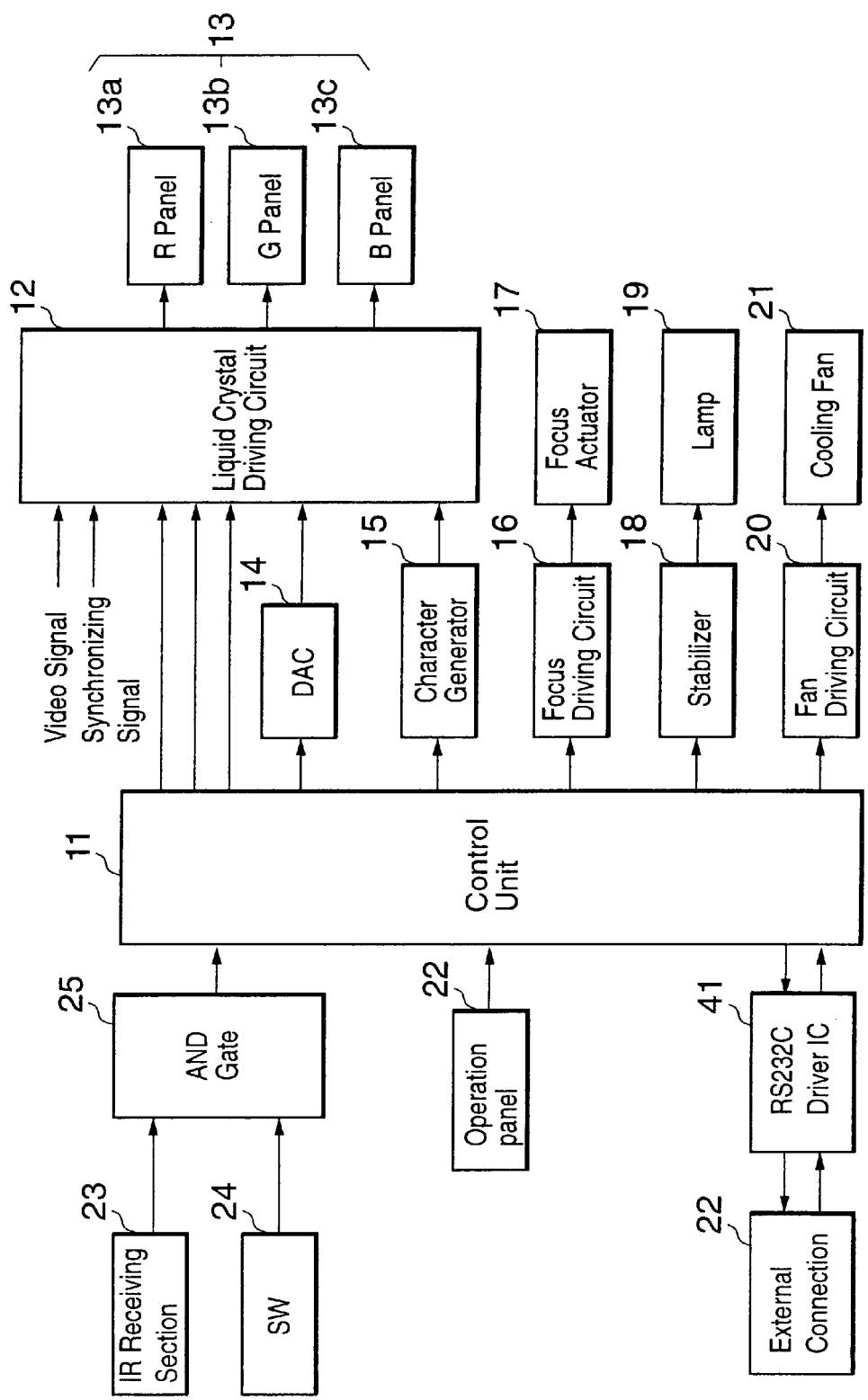
FIG. 14 is a block diagram showing an electric circuitry of a liquid crystal projector according to a third embodiment of the present invention.
Figure 15:
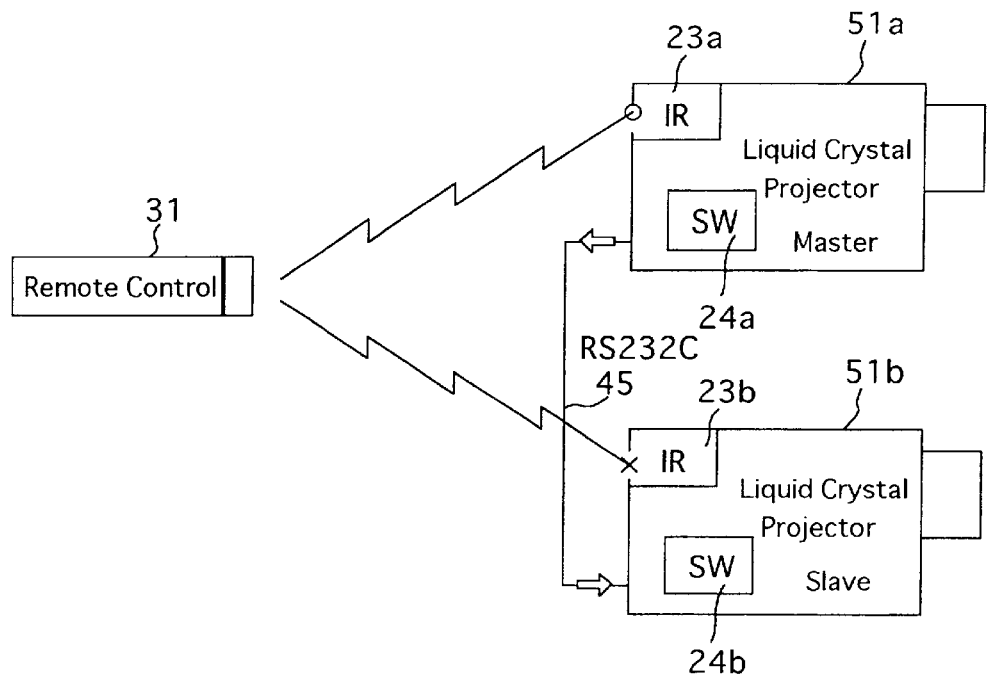
FIG. 15 is a view showing a state of connecting the two liquid crystal projectors of the third embodiment.

FIG. 14 is a block diagram showing an electric circuitry of a liquid crystal projector according to a third embodiment of the present invention. FIG. 15 is a view showing a state of connecting two liquid crystal projectors of the embodiment. In FIG. 14, the same elements as the elements in FIG. 4 are indicated by the same reference numerals as the reference numerals in FIG. 4, and the detailed description is omitted.

As shown in FIG. 14, the liquid crystal projector of the embodiment includes a switch circuit 24 and an AND gate 25 for setting validation/invalidation of a remote control signal received by an IR receiving section 23, an external connector 42 and an RS232C driver IC (integrated circuit) 41 for performing signal transmitting/receiving with other liquid crystal projectors through the external connector 42. As shown in FIG. 14, two liquid crystal projectors 51a and 51b are connected to each other by an RS232C cable 45. As shown in FIG. 15, it is now assumed that a switch circuit 24a of the liquid crystal projector 51a has been turned ON, and a switch circuit 24b of the liquid crystal projector 51b has been turned OFF. In the liquid crystal projector 51a with the circuit switch 24a turned ON, an IR receiving section 23a becomes valid to be a master. On the other hand, in the liquid crystal projector 51b with the switch circuit 24b turned OFF, an IR receiving section becomes invalid to be a slave.

Figure 16A:
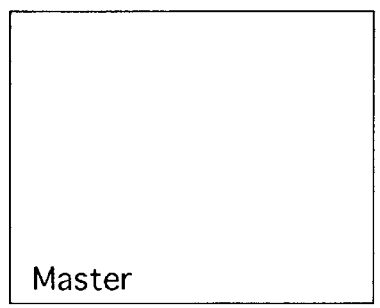
FIGS. 16A and 16B are views, each of which shows an example of a screen display of the liquid crystal projector of the third embodiment.
Figure 16B:
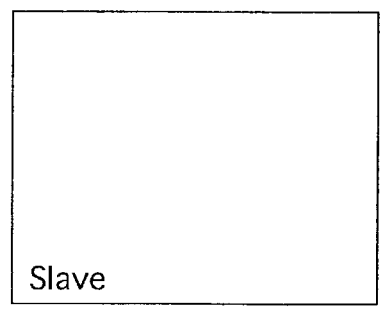

By pressing a predetermined button of a remote control transmitter 31 in the above state, a destination for remote control signal transmission is selected. In other words, upon having received a signal outputted from the remote control transmitter 31 by pressing the predetermined button, for example, as shown in FIG. 16A, the liquid crystal projector 51a displays a character of "MASTER" in the corner of a screen for a given period of time. In this state, a control unit 11 of the liquid crystal projector 51a processes the remote control signal received by the IR receiving section 23a as one intended for the projector 51a. If the predetermined button of the remote control transmitter 31 is pressed again while "MASTER" is displayed in the corner of the screen, then, for example as shown in FIG. 16B, the liquid crystal projector 51a displays a character of "SLAVE" in the corner of the screen for a given period of time. In this state, the liquid crystal projector 51a processes the remote control signal received by the IR receiving section 23a as one intended for the liquid crystal projector 51b. In other words, the liquid crystal projector 51a analyzes a command contained in the received signal, and transmits the command through the RS232C cable 45 to the liquid crystal projector 51b.

Figure 17:
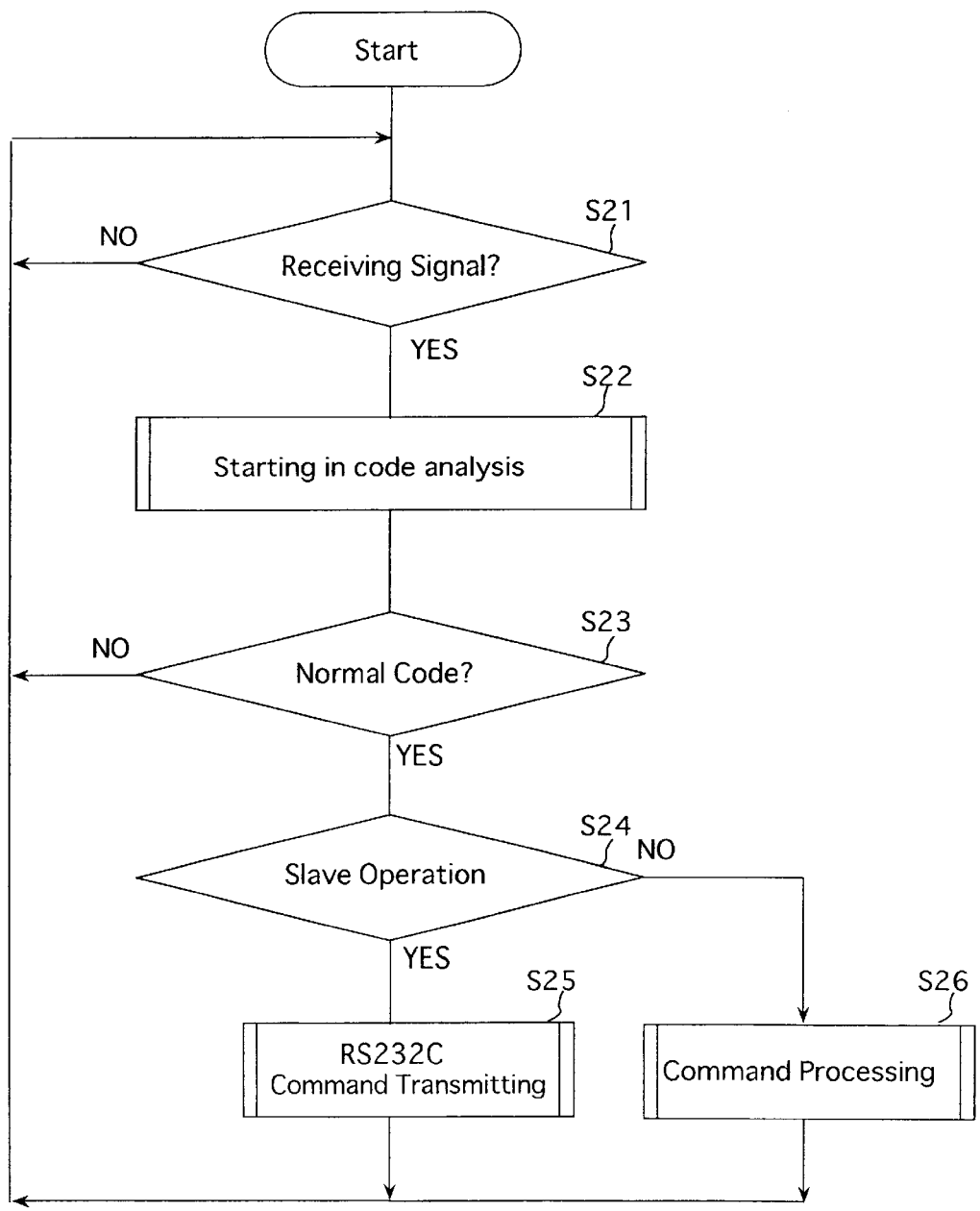
FIG. 17 is a flowchart showing an operation performed by the liquid crystal projector of the master side of the third embodiment at the time of receiving a remote control signal.

FIG. 17 is a flowchart showing an operation of the master liquid crystal projector 51a at the time of receiving a remote control signal. In step S21, the control unit 11 monitors reception of a remote control signal. If the reception of a remote control signal is determined, the process moves to step S22, and code analysis starts. Then, in step S23, determination is made as to whether a code of the received signal is normal or not, in other words, whether the code is one for the liquid crystal projector or not. If NO, the process returns to step S21. On the other hand, if normalcy of the code is determined, the process moves from step S23 to step S24. Then, depending on current "MASTER" or "SLAVE" setting in the signal destination side, the process moves to either step S25 or step S26. If the process moves to step S25, the command is transmitted through the RS232C cable to the liquid crystal projector 51b, and then the process returns to step S21. Upon having received the command through the RS232C cable, a control unit 11 of the liquid crystal projector 51b executes processing according to the command. For example, the control unit 11 drives a focus actuator to adjust a focus or brightness.

On the other hand, if the process moves to step S26, the control unit 11 of the liquid crystal projector 51a executes processing according to the command. For example, the control unit 11 drives a focus actuator to adjust a focus or brightness. Then, the process returns to step S21.

In accordance with the embodiment, master or slave setting is selected for the liquid crystal projector by the switch circuit 24, and only the control unit 11 of the liquid crystal projector 51a set as a master receives the remote control signal. Then, the command can be transmitted from the master liquid crystal projector 51a through the RS232C cable to the liquid crystal projector 51b set as a slave. Accordingly, a focus or brightness can be individually adjusted not only for the master liquid crystal projector 51a but also for the slave liquid crystal projector 51b.

The third embodiment has been described by taking the example of the two liquid crystal projectors 51a and 51b connected to each other by the RS232C cable. Needless to say, a connection interface should not be limited to the RS232C cable. Preferably, however, to connect the liquid crystal projectors, a serial interface having a small number of signal conductors like the RS232C cable should be used.

Furthermore, according to the embodiment, the remote control transmitter is provided with the button dedicated to switching of destinations for signal transmission. But a destination for signal transmission may be switched to another, for example, when a "SELECT" button is pressed for a predetermined period of time or more.

Fourth Embodiment

Figure 18:
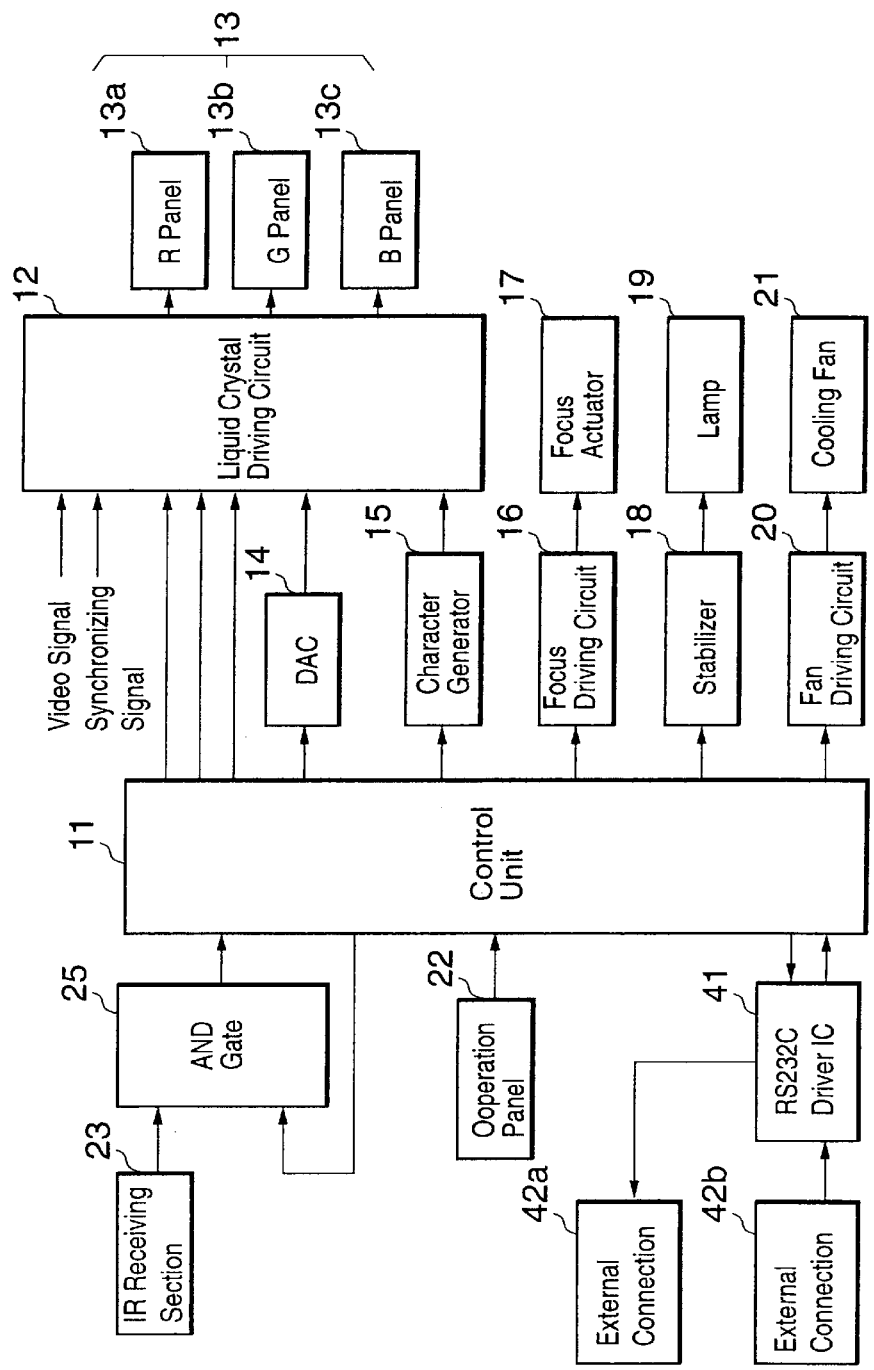
FIG. 18 is a block diagram showing an electric circuitry of a liquid crystal projector according to a fourth embodiment of the present invention.

FIG. 18 is a block diagram showing an electric circuitry of a liquid crystal projector according to a fourth embodiment of the present invention. In FIG. 18, the same elements as the elements in FIG. 4 are indicated by the same reference numerals as the reference numerals in FIG. 4, and the detailed description is omitted.

In accordance with the embodiment, a signal outputted from a control unit 11 is supplied to an AND gate 25. The AND gate 25 transmits a remote control signal received by an IR receiving section 23 to the control unit 11 when the signal from the control unit 11 is "H". When the signal from the control unit 11 is "L", the IR receiving section 23 and the control unit 11 are disconnected from each other. Also, in accordance with the embodiment, the liquid crystal projector includes an RS232C driver IC 41 and two external connectors 42a and 42b. Through the external connector 42a, commands are transmitted to the other liquid crystal projectors and, through the external connector 42b, commands are received from the other liquid crystal projectors.

Figure 19:
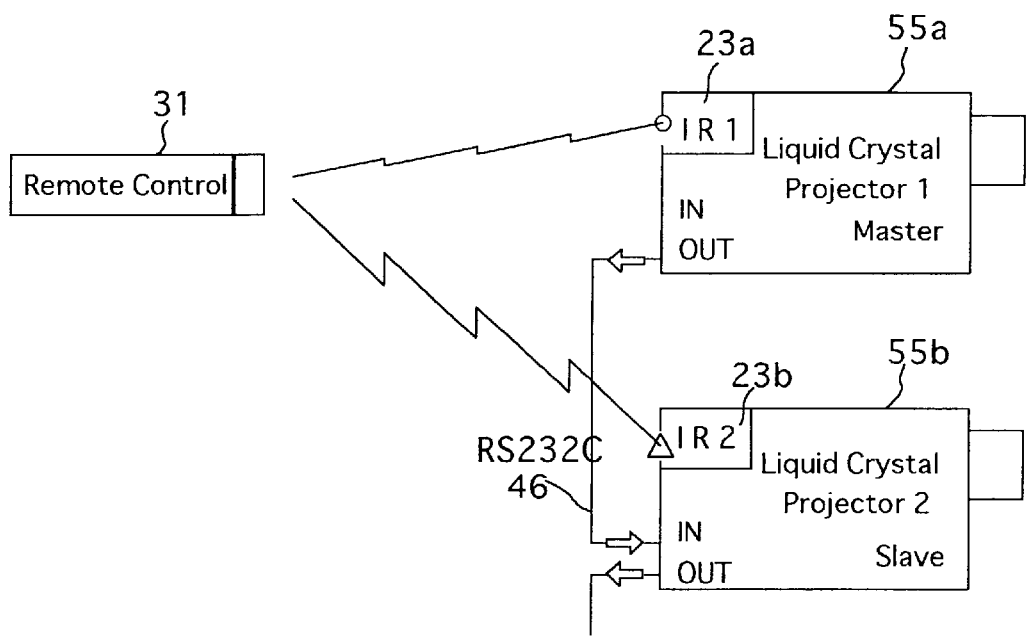
FIG. 19 is a view showing a state of connecting a plurality of liquid crystal projectors of the fourth embodiment.

Then, as shown in FIG. 19, a plurality (only two are shown in the drawing) of liquid crystal projectors 55a and 55b are connected to each other by an RS232C cable 46. In accordance with the embodiment, by pressing a predetermined button of a remote control transmitter, a master/slave setting command is transmitted from the remote control transmitter. A control unit 11 of each liquid crystal projector is set to be a master in an initial state, and outputs "H" to the AND gate 25. After the master/slave setting command has been entered through the IR receiving section 23, the control unit 11 outputs the master/slave setting command through the external connector 42a. After the master/slave setting command has been entered through the external connector 42b, the control unit 11 sets itself as a slave and outputs "L" to the AND gate 25. Once the liquid crystal projector is set as a slave, this slave setting is maintained until power is turned OFF.

Figure 20:
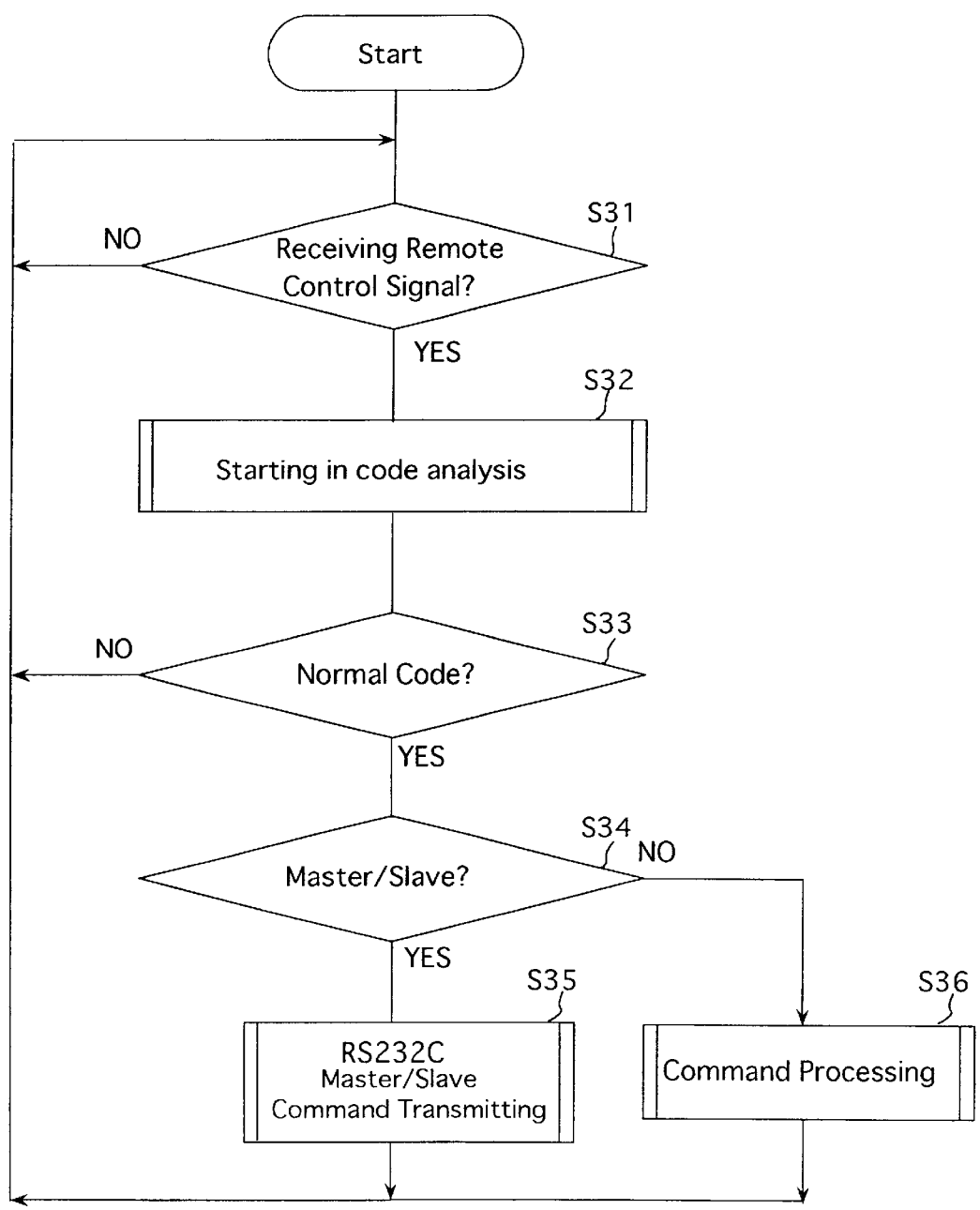
FIG. 20 is a flowchart showing an operation of the liquid crystal projector of the fourth embodiment at the time of receiving a remote control signal.

FIG. 20 is a flowchart showing an operation of the liquid crystal projector of the embodiment at the time of receiving a remote control signal.

First, in step S31, the control unit 11 outputs "H" to the AND gate 25, and monitors the presence or absence of a remote control signal from the IR receiving section 23. After the remote control signal has been entered, the process moves to step S32, and a code analysis starts. If a code is not normal, then, the process returns to step S31. If the code is normal, the process moves to step S34. In step S34, determination is made as to whether the received code is a master/slave setting command or not.

If the received code is a master/slave setting command, then, the process moves to step S35, and the master/slave setting command is outputted through the external connector 42a. On the other hand, in step S34, if the received command is not a master/slave setting command, then, the process moves to step S37, and processing is executed according to the command. The above processing is started by turning ON power, and finished by turning OFF power.

Figure 21:
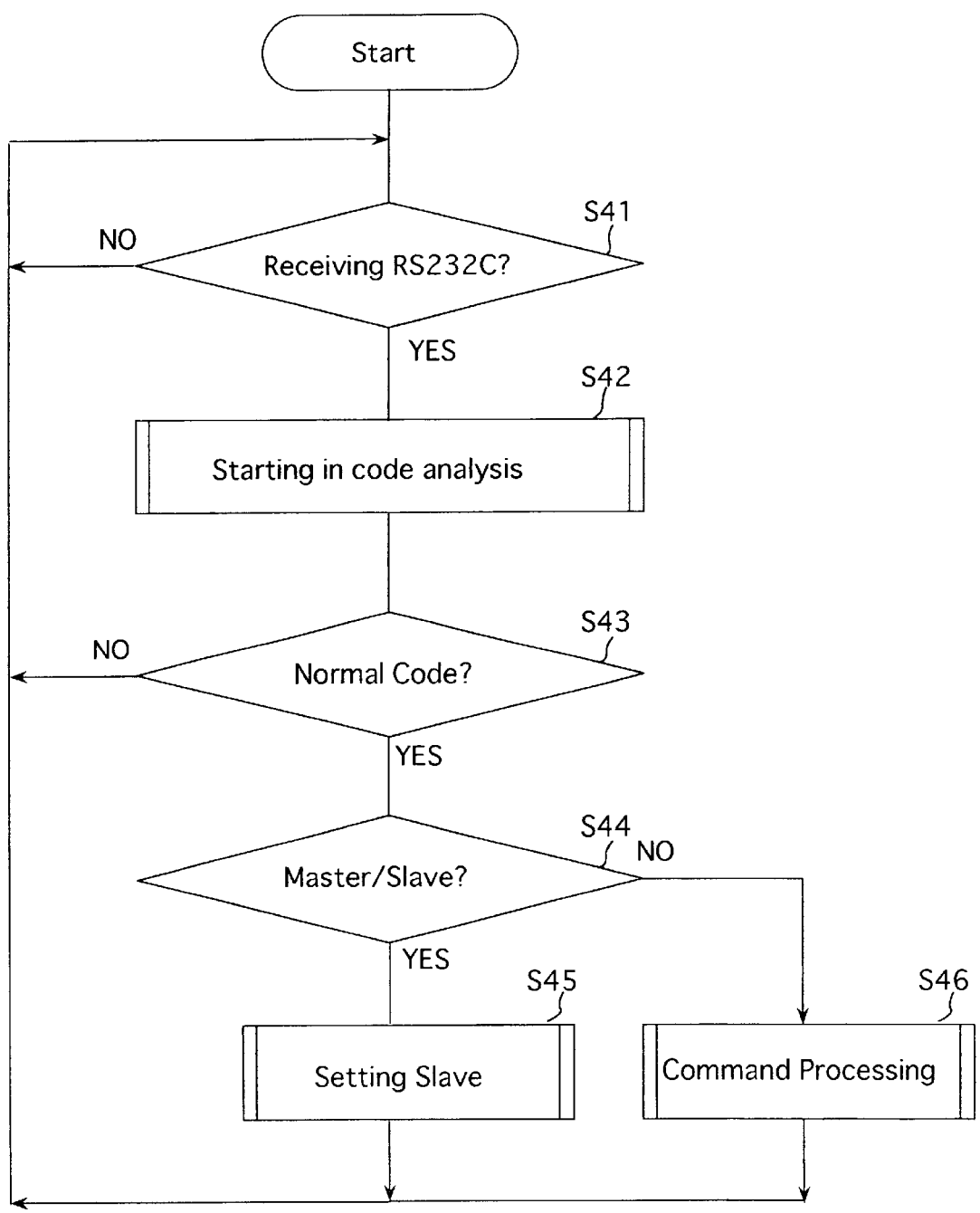
FIG. 21 is a flowchart showing an operation performed by the liquid crystal projector of the fourth embodiment at the time of receiving a signal through RS232C.

FIG. 21 is a flowchart showing an operation of the liquid crystal projector of the embodiment when a signal is received through the RS232C cable.

First, the control unit 11 monitors reception of a command through the external connector 42b. After a command has been entered through the external connector 42b, the process moves to step S42, and a command analysis starts. Then, in step S43, determination is made as to whether the command is normal or not. If NO, the process ignores the received command and returns to step S41.

On the other hand, if the command received in step S43 is normal, then the process moves to step S44, and determination is made as to whether the command is a master/slave setting command or not. If the command is a master/slave setting command, then the process moves to step S45, and the control unit 11 outputs "L" to the AND gate 25. Accordingly, the signal received by the IR receiving section 23 is prevented from being transmitted to the control unit 11. In other words, the liquid crystal projector thereof is set as a slave. According to the embodiment, once the projector is set as a slave, this slave setting is maintained until power is turned OFF. Subsequently, the process returns to step S41.

On the other hand, if the command received in step S44 is not a master/slave setting command, then the process moves from step S44 to step S46, and processing is executed according to the received command. Then, the process returns to step S41.

In accordance with the embodiment, as shown by the flowcharts of FIGS. 20 and 21, the liquid crystal projector that has received the master/slave setting command through the RS232C cable 46 from another liquid crystal projector is automatically set as a slave. Only the liquid crystal projector that has not received the master/slave setting command from another liquid crystal projector is set as a master. Thus, compared with the third embodiment, the fourth embodiment is advantageous in that it is not necessary to perform manual master/slave setting for each projector.

The above example has been described with reference to the case where once set as a slave, this slave setting is maintained until power is turned OFF. But the slave setting may be released after the passage of a given period of time or when a specified command is entered through the RS232C cable.

Fifth Embodiment

Figure 6:
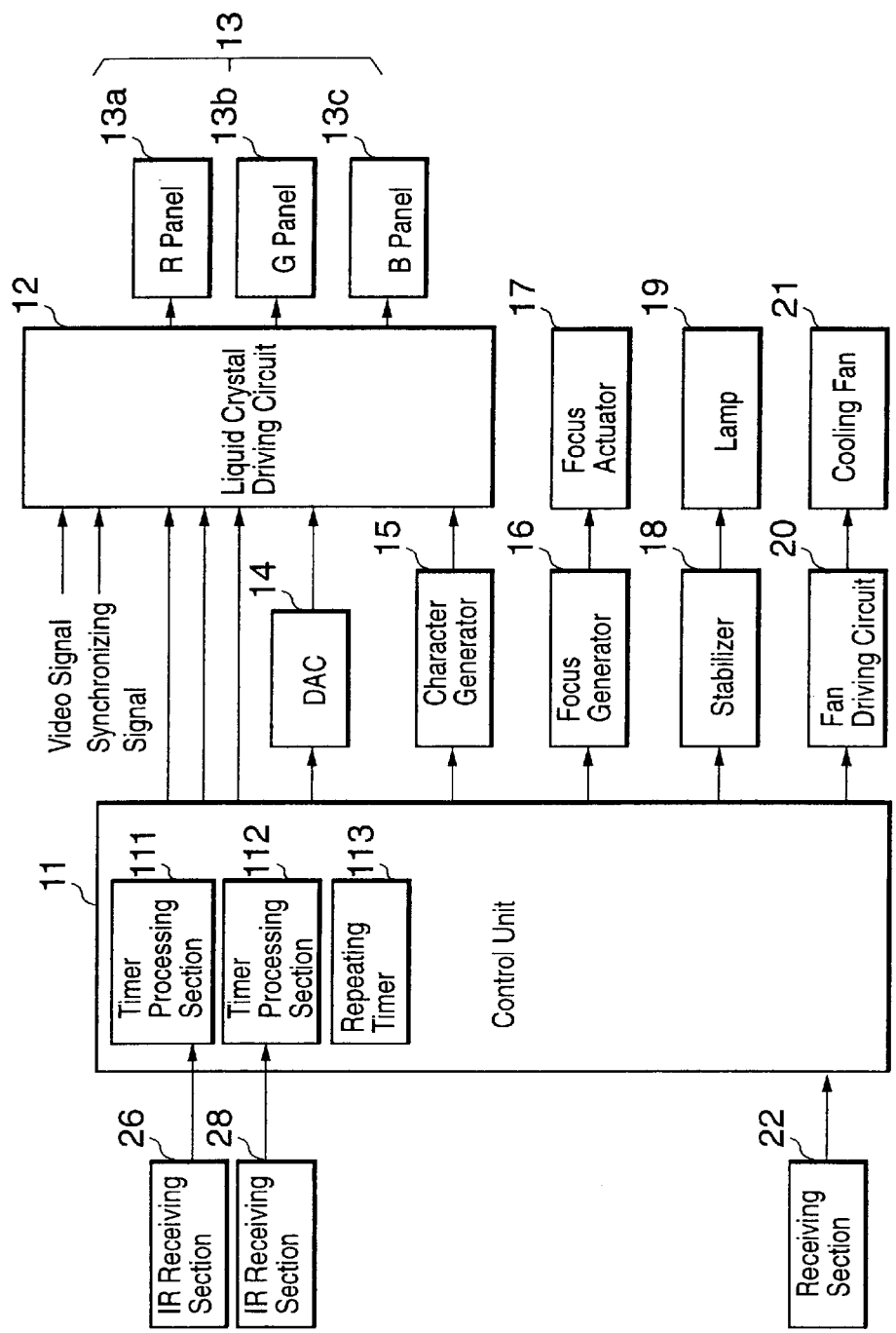
FIG. 6 is a block diagram showing an electric circuitry of a liquid crystal projector according to a fifth embodiment of the present invention.

FIG. 6 is a block diagram showing an electric circuitry of a liquid crystal projector according to a fifth embodiment of the present invention. In FIG. 6, the same elements as the elements in FIG. 1 are indicated by the same reference numerals as the reference numerals in FIG. 1, and the detailed description is omitted. Also, in the fifth embodiment, an optical engine is basically similar in constitution to that of the conventional example (see FIG. 1).

The liquid crystal projector of the embodiment includes IR receiving sections 26 and 28 in its front and rear sides (see FIG. 12). A control unit 11 is provided with timer processing sections 111 and 112 and a repeat timer 113. The timer processing section 111 monitors an output of the IR receiving section 26 arranged in the front side of the projector. When a signal is outputted from the IR receiving section 26, determination is made as to whether the signal is a remote control signal intended for the liquid crystal projector or not. Likewise, the timer processing section 112 monitors an output of the IR receiving section 28 arranged in the rear side of the projector. When a signal is outputted from the IR receiving section 28, determination is made as to whether the signal is a remote control signal intended for the liquid crystal projector or not. Operations of the IR receiving sections 111 and 112 will be described later in detail.

The repeat timer 113 counts time, and has a function of notifying to a microprocessor of the control unit 11, when a count value reaches a specified value. The microprocessor realizes repeating processing by using the repeat timer 113. Repeating processing means processing to continue a specified operation while a user continues to press a button of a remote controller. By this repeating processing, for example, the following operation is realized. While the user continues to press a focus adjusting button, a focus actuator 17 is operated to continuously change focuses. When the user loses hold of the focus adjusting button, the operation of the focus actuator 17 is stopped.

The timer processing sections 111 and 112 and the repeat timer 113 are realized by the microprocessor and software incorporated in the control unit 11.

Figure 22:
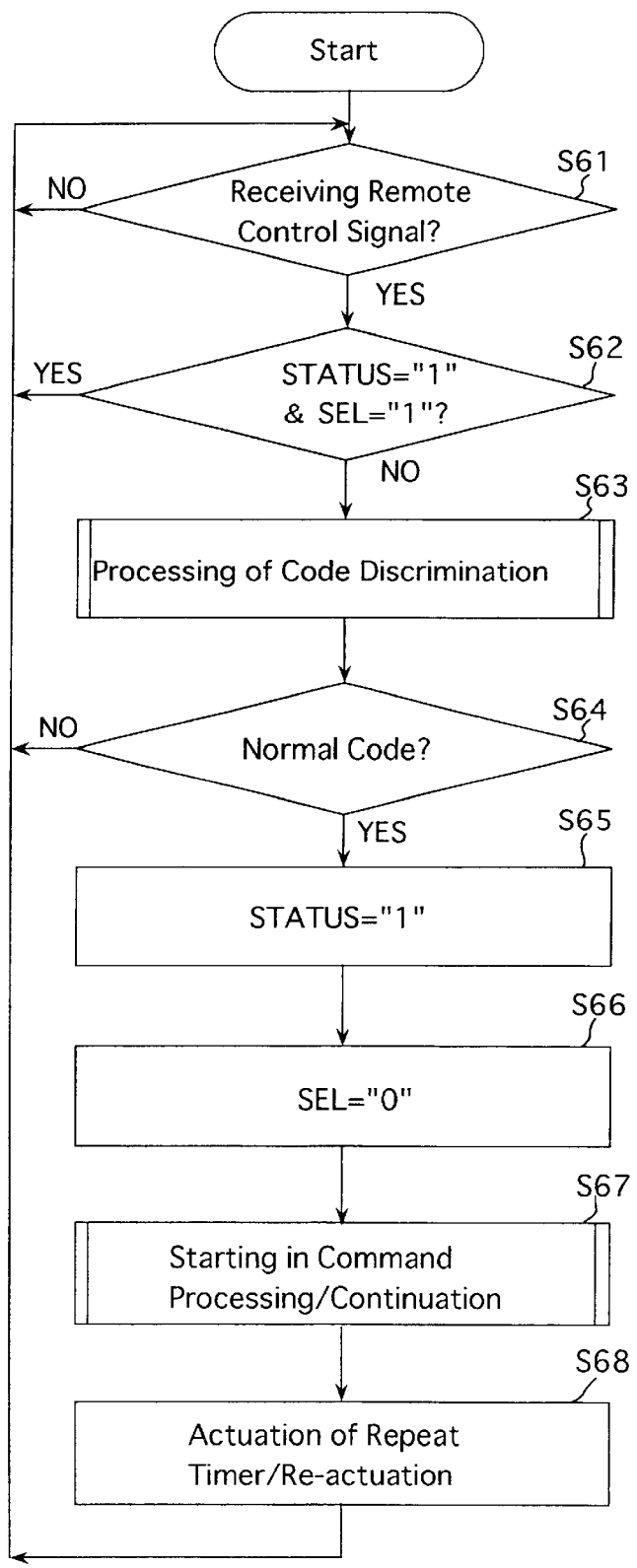
FIG. 22 is a flowchart showing an operation of a timer processing section for processing a signal from an IR receiving section arranged in a front side of the projector of the fifth embodiment.
Figure 23:
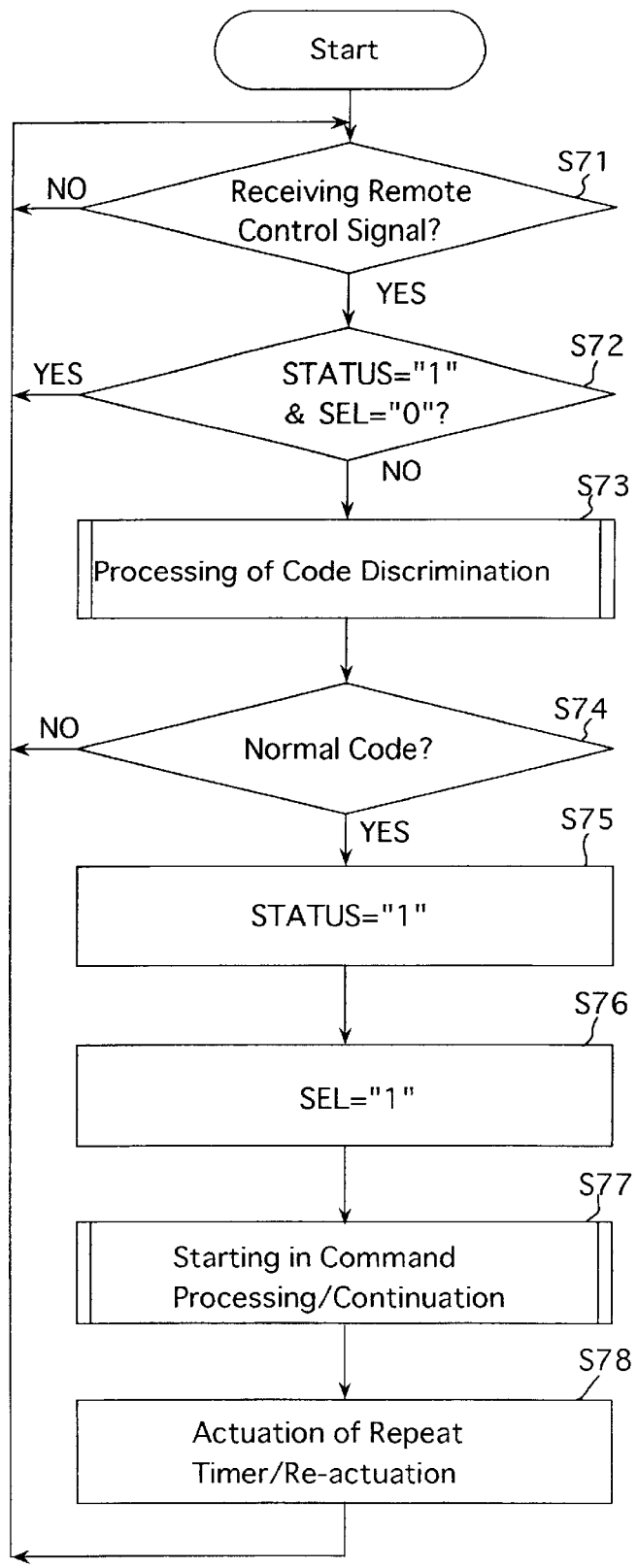
FIG. 23 is a flowchart showing an operation of another timer processing section for processing a signal from another IR receiving section arranged in a rear side of the projector of the fifth embodiment.
Figure 24:
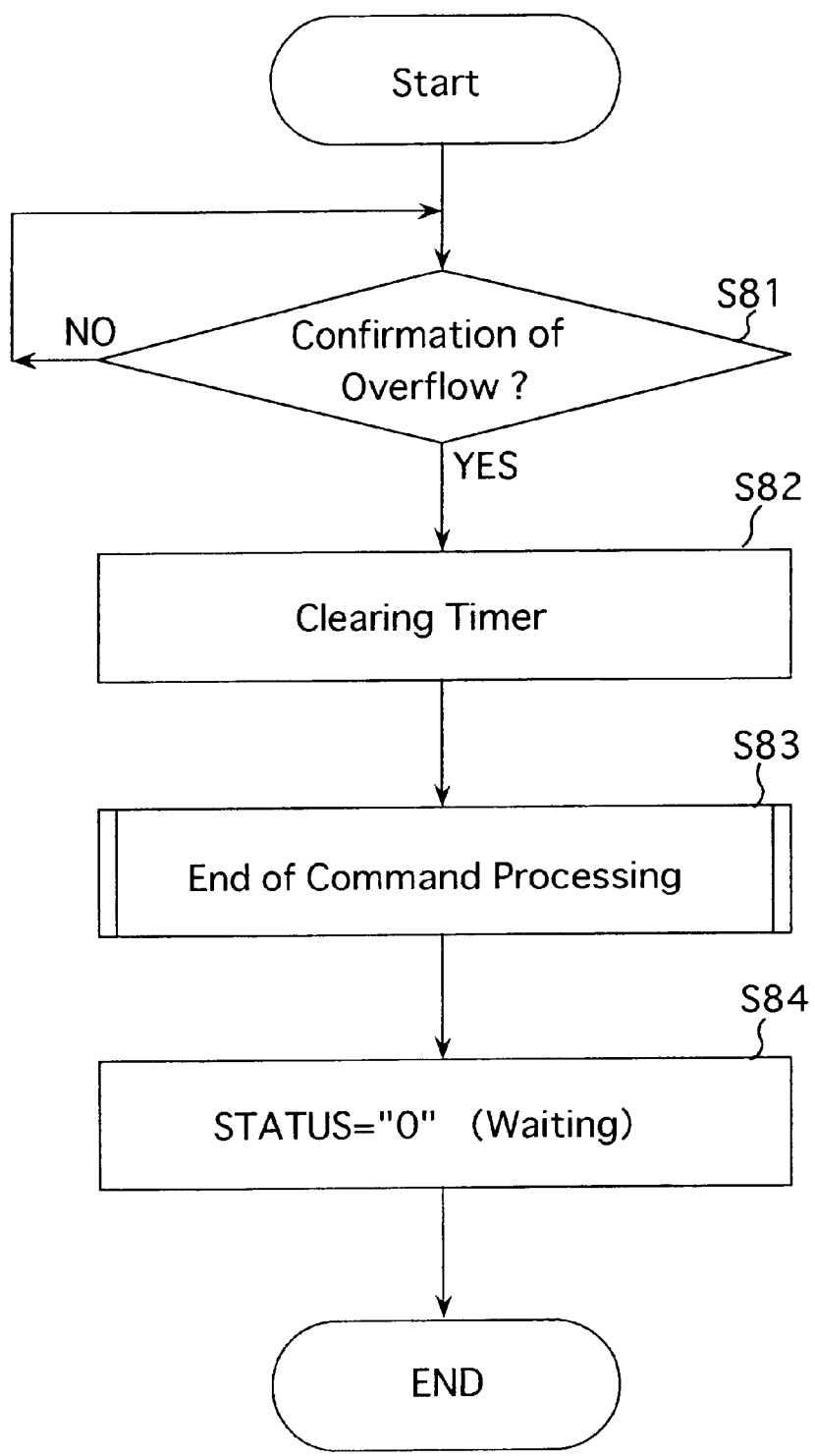
FIG. 24 is a flowchart showing a repeating operation performed by the projector of the fifth embodiment.

FIG. 22 is a flowchart showing an operation of the timer processing section 111 for processing a signal from the IR receiving section 26 arranged in the front side of the projector; FIG. 23 is a flowchart showing an operation of the timer processing section 112 for processing a signal from the IR receiving section 28 arranged in the rear side thereof; and FIG. 24 is a flowchart showing repeating processing. The two timer processing sections 111 and 112 are provided with, as common flags, a STATUS flag set to "1" when a normal code is determined, and a "SEL" flag set to "1" when a light receiving element used for determining a normal code is the IR receiving section 28 and to "0" when a light receiving element used for determining a normal code is the IR receiving section 26. For example, when power is turned ON for the projector, the microprocessor in the control unit 11 sets both of the STATUS and SEL flags to "0".

First, an operation of the timer processing section 11 shown in FIG. 22 will be described. It is now assumed that the microprocessor in the control unit 11 has set both of the STATUS and SEL flags to "0" beforehand.

First, in step S61, the timer processing section 111 monitors a signal coming from the IR receiving section 26. After a remote control signal has been entered from the IR receiving section 26, the process moves to step S62. Whether the signal is a remote control signal or not is determined by the following method.

FIG. 25 is a view showing an example of a signal pulse in each of leader, code data and trailer sections of a remote control signal (see FIG. 9). In this example, based on a ratio between periods of "H" and "L", "1" and "0" of the leader and code data sections and the trailer section are determined. In other words, if a basic pulse width is T, in the leader section, the period of "H" has a pulse of 8T, and the period of "L" has a pulse of 4T. In the code data section, when "H" is T and "L" is T, "0" is determined. When "H" is T and "L" is 3T, "1" is determined. Further, when the period of "H" is T and the period of "L" is 100T, the trailer section is determined.

The timer processing sections 111 and 112 measures time periods of "H" and "L" for signals entered from the IR receiving sections 26 and 28. If the period of "H" is 8T and the subsequent period of "L" is 4T, then, detection of the leader of a remote control signal is determined, and the process moves from step S61 to step S62.

In step S62, investigation is made into states of the STATUS and SEL flags. If the STATUS flag is "1" and the SEL flag is "1", then the process moves to step S63. Other than these states, the process returns to step S61, and monitoring of a signal from the IR receiving section 26 is continued. As the STATUS flag is "0" initially, the process moves from step S62 to step S63 irrespective of the state of the SEL flag. If the SEL flag has been changed to "1" by processing performed by the timer processing section 112 shown in FIG. 23, then the process returns from step S62 to step S61.

In step S63, code determination is carried out for the signal received from the IR receiving section 26. The control unit 11 performs a code data analysis for the received remote control signal, investigates whether a code is one intended for the liquid crystal projector or not, and then extracts a command contained in the remote control signal if the code is for liquid crystal projector. If normalcy of the code is determined as a result of performing the code determination in step S63, then the process moves from step S64 to step S65. If normalcy of the code is not determined, then, the process returns from step S64 to step S61.

In step S65, the STATUS flag is set to "1". Then, the process moves to step S66, and the SEL flag is set to "0". Setting of the SEL flag to "0" enables only a signal entered from the IR receiving section 26 to be valid, and a signal entered from the IR receiving section 28 is ignored.

Proceeding to step S67, processing starts according to the command extracted from the remote control signal. It is now assumed that a focus adjusting command has been received. In this case, the control unit 11 outputs a focus actuator driving signal to a focus driving circuit 16 according to the received command. The focus driving circuit 16 accordingly starts to drive the focus actuator 17.

Then proceeding to step S68, the microprocessor in the control unit 11 actuates the repeat timer 113. Then, the repeat timer 113 starts to count time. In this example, the repeat timer 113 counts time of 300 msec. For the IR remote controller, time necessary for transmitting one command is generally 100 to 150 msec. Thus, if the user continues to press the button of the remote controller, then remote control signals are repeatedly transmitted at an interval of about 100 to 150 msec.

After the repeat timer 113 has been actuated, the process returns to step S61, and continues the above processing. At this time, if the user continues to press the button of the remote controller, a count value of the repeat timer 113 is reset in step S68, and the command processing (in this example, the driving of the actuator 17) continues.

Next, an operation of the timer processing section 112 shown in FIG. 22 will be described.

First, in step S71, the timer processing section 112 monitors a signal coming from the IR receiving section 28. After a remote control signal has been entered from the IR receiving section 28, the process moves to step S72.

In step S72, investigation is made into states of the STATUS and SEL flags. If the STATUS flag is "1" and the SEL flag is "1", then, the process moves to step S73. Other than the above states, the process returns to step S71, and monitoring of a signal from the IR receiving section 28 is continued. As described above, if the SEL flag has been set to "1" in the timer processing section 111, then, the process ignores the signal from the IR receiving section 28, and returns to step S71. In step S73, code determination is executed for the signal received from the IR receiving section 28. In other words, the control unit 11 performs a code analysis for the received remote control signal, investigates whether the code is one intended for the liquid crystal projector or not, and extracts a command contained in the remote control signal if the code is for the liquid crystal projector. If normalcy of the code is determined as a result of performing the code determination in step S73, the process moves from step S74 to step S75. If normalcy of the code is not determined, then, the process returns from step S74 to step S71.

In step S75, the STATUS flag is set to "1". Subsequently, the process moves to step S76, and sets the SEL flag to "1". In this way, only a signal entered from the IR receiving section 28 is made valid, and a signal entered from the IR receiving section 26 is ignored.

Then, proceeding to step S77, processing is started according to the command extracted from the remote control signal. For example, if a focus adjusting command is received, then, the control unit 11 drives the focus actuator 17 by the focus driving circuit 16.

Then, proceeding to step S78, the microprocessor in the control unit 11 actuates the repeat timer 113. Then, the repeat timer 113 starts to count time. After the repeat timer 113 has been actuated in step S78, the process returns to step S71, and continues the above processing. If the user continues to press a button of the remote controller, then, a count value of the repeat timer 113 is reset in step S78, and the command processing continues.

Next, repeating processing performed by using the repeat timer 113 will be described by referring to FIG. 24.

In step S81, a count value of the repeat timer 113 actuated in step S68 of FIG. 22 or step S78 of FIG. 23 has reached a specified count value (in this example, 300 msec.), then the repeat timer generates interruption, and notifies the microprocessor in the control unit 11 of a state of overflowing. Then, the process moves to step S82, and the microprocessor clears the value of the repeat timer 113. Also, in step S83, command processing is finished. In this example, the driving of the focus actuator 17 started in step S67 or step S77 is stopped in step S83. Subsequently, proceeding to step S84, the STATUS flag is set to "0". Accordingly, both of the IR receiving sections 26 and 28 become valid.

Figure 26:
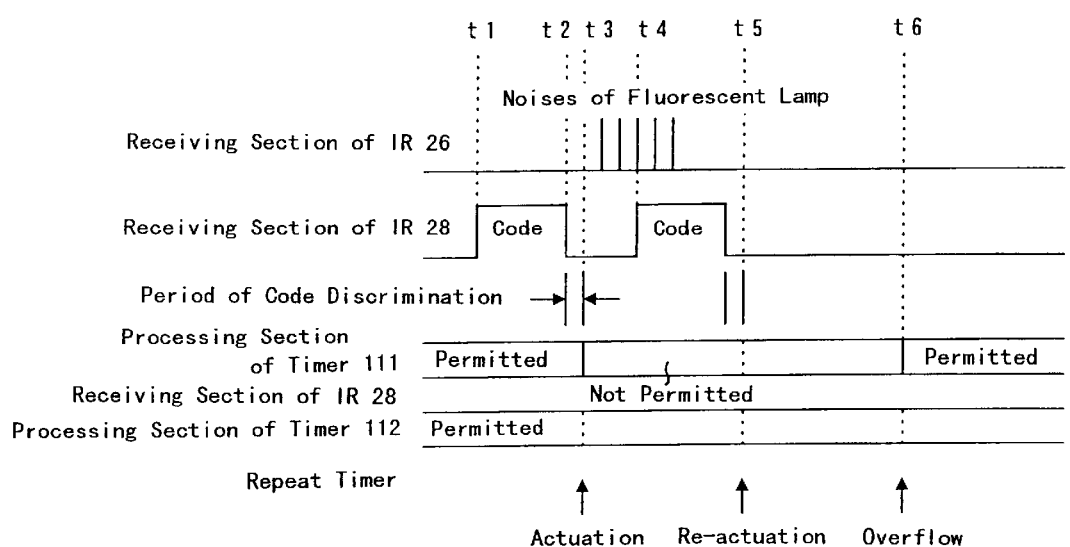
FIG. 26 is a timing chart showing an operation performed by the projector of the fifth embodiment.

FIG. 26 is a timing chart showing an operation of the embodiment. In an initial state, the timer processing sections 111 and 112 are both in valid (permitted) states. It is now assumed that the IR receiving section 28 receives a remote control signal at time t1. Then, the control unit 11 executes the processing flow shown in FIG. 23. From time t2 after the receiving of the remote control signal has been completed, determination is made as to whether a code thereof is normal or not. At time t3, the code determination is finished. If it is determined that the code is normal, then the timer processing section 112 makes a signal from the IR receiving section 26 invalid (not permitted), and the repeat timer 113 is actuated.

As the signal processing (timer processing section 111) makes the signal from the IR receiving section 26 invalid, even if the IR receiving section 26 receives noises of a fluorescent lamp, for instance from time t3 to t5, any erroneous operations are prevented.

If the user continues to press the button of the remote controller, then a remote control signal is entered again to the IR receiving section 28 at time t4. The control unit 11 analyzes a command contained in this remote control signal and, at time t5, the repeat timer 113 is reset and actuated again.

If no remote control signals are received by the IR receiving section 28 from time t5 to t6 when the repeat timer 113 reaches time-up (overflowing), at the same time when the repeat timer 113 reaches time-up (overflowing), the command processing, driving of the focus actuator in this example, is stopped. Also, at the same time, the STATUS flag is set to "0", and the timer processing sections 111 and 112 both become valid (permitted).

In accordance with the embodiment, one of the two IR receiving sections 26 and 28 receives a remote control signal in a normal manner before the other. Then, a signal from this IR receiving section having received the remote control signal before the other is made valid, and a signal from the other IR receiving section is ignored. Accordingly, even if noises enter the other IR receiving section from a fluorescent lamp or the like, any erroneous operations can be prevented.

Furthermore, in the embodiment, the STATUS and SEL flags are changed for setting after a command analysis is finished. But the STATUS and SEL flags may be changed for setting before the command analysis is finished. For example, after the header section of the remote control signal is received in a normal manner, the STATUS and SEL flags can be changed for setting before the command analysis is performed or during execution thereof. Also, the embodiment has been described with reference to the case of providing the projector with the two IR receiving sections. But the present invention can also be applied to a projector provided with three or more IR receiving sections.

What is claimed is:

1. A projection image display device comprising:
   an image generator for generating an image according to a video signal;
   an image projecting unit for projecting the image generated by the image generator on a screen;
   an image adjusting circuit for adjusting the image projected on the screen;
   a remote control signal receiver for receiving a remote control signal outputted from a remote control transmitter;
   a control circuit for controlling the image adjusting circuit according to a signal outputted from the remote control signal receiver; and
   a switching unit for performing switching between a first state of transmitting an output of the remote control signal receiver to the control circuit and a second state of transmitting no outputs of the remote control signal receiver to the control circuit,
   wherein the switching unit performs switching between the first and second states according to a signal from the control circuit, and transmits the output of the remote control signal receiver to the control circuit continuously in the first state and does not transmit the outputs of the remote control signal receiver to the control circuit in the second state.

2. A projection image display device comprising:

an image generator for generating an image according to a video signal;

an image projecting unit for projecting the image generated by the image generator on a screen;

an image adjusting circuit for adjusting the image projected on the screen;

a remote control signal receiver for receiving a remote control signal outputted from a remote control transmitter;

a control circuit for controlling the image adjusting circuit according to a signal outputted from the remote control signal receiver;

a switching unit for performing switching between a first state of transmitting an output of the remote control signal receiver to the control circuit and a second state of transmitting no outputs of the remote control signal receiver to the control circuit; and an external connection terminal to be connected to another display device, wherein the control circuit communicates with the another display device through the external connection terminal, and the control circuit controls the switching unit according to a signal entered through the external connection terminal.

3. A projection image display device comprising:

an image generator for generating an image according to a video signal;

an image projecting unit for projecting the image generated by the image generator on a screen;

an image adjusting circuit for adjusting the image projected on the screen;

a remote control signal receiver for receiving a remote control signal outputted from a remote control transmitter;

a control circuit for controlling the image adjusting circuit according to a signal outputted from the remote control signal receiver;

a switching unit for performing switching between a first state of transmitting an output of the remote control signal receiver to the control circuit and a second state of transmitting no outputs of the remote control signal receiver to the control circuit; and an external connection terminal to be connected to another display device, wherein the control circuit communicates with the another display device through the external connection terminal, and when a signal is entered from another display device through the external connection terminal, the control circuit controls the switching unit to switch to the second state.

4. A projection image display device comprising:

an image generator for generating an image according to a video signal;

an image projecting unit for projecting the image generated by the image generator on a screen;

an image adjusting circuit for adjusting the image projected on the screen;

a first remote control signal receiver provided in the screen side for receiving a remote control signal outputted from a remote control transmitter;

a second remote control signal receiver provided in the opposite side of the screen for receiving directly a remote control signal outputted from the remote control transmitter;

a control circuit for controlling the image adjusting circuit according to a signal outputted from one of the first and second remote control signal receivers;

a first switching unit for performing switching between first and second states, the first state being for transmitting an output of the first remote control signal receiver to the control circuit according to a first signal from the control circuit, and the second state being for transmitting no outputs of the remote control signal receiver to the control circuit; and a second switching unit for performing switching between first and second states, the first state being for transmitting an output of the second remote control signal receiver to the control circuit according to a second signal from the control circuit, and the second state being for transmitting no outputs of the remote control signal receiver to the control circuit.

5. A projection image display device comprising:

an image generator for generating an image according to a video signal;

an image projecting unit for projecting the image generated by the image generator on a screen;

an image adjusting circuit for adjusting the image projected on the screen;

a plurality of remote control signal receivers for receiving remote control signal outputted from a remote control transmitter; and a control circuit for monitoring outputs ofthe plurality of remote control signal receivers, controlling the image adjusting circuit according to a remote control signal which is a normal remote control signal having been received by any one of the remote control signal receivers, and ignoring signals received by the other remote control signal receivers at least for a specified period of time until the control of the image adjusting circuit according to the remote control signal is completed.

6. The projection image display device according to claim 5, wherein the specified period of time is longer than repeated transmission time of the remote control signal.

* * * * *